(12) United States Patent
Attard

(10) Patent No.: US 11,820,854 B2
(45) Date of Patent: *Nov. 21, 2023

(54) MOLECULARLY RESILIENT AND HIGH-ENERGY TRANSFERRABLE COMPOSITE MATERIALS AND METHODS OF REINFORCING SUBSTRATES WITH THE SAME

(71) Applicant: Thomas Attard, Gold Canyon, AL (US)

(72) Inventor: Thomas Attard, Gold Canyon, AL (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/585,670

(22) Filed: Jan. 27, 2022

(65) Prior Publication Data

US 2022/0213257 A1    Jul. 7, 2022

Related U.S. Application Data

(63) Continuation of application No. 16/944,058, filed on Jul. 30, 2020, now Pat. No. 11,279,793.

(Continued)

(51) Int. Cl.
*C08G 18/58*    (2006.01)
*B32B 5/02*    (2006.01)
(Continued)

(52) U.S. Cl.
CPC ............... *C08G 18/58* (2013.01); *B32B 5/02* (2013.01); *C08G 18/10* (2013.01); *C08G 18/755* (2013.01);
(Continued)

(58) Field of Classification Search
CPC ...... C08G 18/58; C08G 18/10; C08G 18/755; C08G 18/003; C08G 18/5024; B32B 5/02;
(Continued)

(56) References Cited

U.S. PATENT DOCUMENTS 5,415,499 A    5/1995    Hyde-Smith et al.
11,279,793 B2    3/2022    Attard
(Continued)

OTHER PUBLICATIONS

Grignard, Bruno et al., "Advances in the use of CO2 as a renewable feedstock for the synthesis of polymers", Jul. 5, 2019, Chem. Soc. Rev., vol. 48, Iss. 16, pp. 4466-4514 (Year: 2019).

(Continued)

*Primary Examiner* — Callie E Shosho
*Assistant Examiner* — Steven A Rice
(74) *Attorney, Agent, or Firm* — Howard & Howard Attorneys PLLC

(57) ABSTRACT

A molecularly resilient and high-energy transferable material and method of reinforcing and strengthening substrates with the same. The material includes aliphatic polyurea moieties coated on the surface of a pre-curing or curing epoxy, that may or may not compose a fiber reinforced epoxy (F/E) layer, constituting an isophorone diisocyanate amine (IDA) epoxy-surface modification (reaction) to form an interfacial epoxy-polyurea hybridized-matrix (IEPM) material between the epoxy (that may reside on an F/E layer) and a cured polyurea layer. Through its unique set of molecular vibrational properties, which are designed into the IEPM by controlling the thermodynamic IPA reaction, the chemically bonded and molecularly resilient (regenerative) IEPM material incorporates significant fracture toughness, loss modulus (material damping), and reduced elastic modulus into structural substrates and high-tenacity fibers to which it is adhered.

19 Claims, 16 Drawing Sheets

Related U.S. Application Data

(60) Provisional application No. 62/886,329, filed on Aug. 13, 2019, provisional application No. 62/880,644, filed on Jul. 30, 2019.

(51) Int. Cl.

| | | |
|---|---|---|
| *C08G 18/10* | (2006.01) | |
| *C08G 18/75* | (2006.01) | |
| *C08J 3/24* | (2006.01) | |
| *C08J 5/04* | (2006.01) | |
| *C08J 7/16* | (2006.01) | |

(52) U.S. Cl.
CPC ............... *C08J 3/244* (2013.01); *C08J 3/245* (2013.01); *C08J 5/042* (2013.01); *C08J 7/16* (2013.01); *B32B 2255/02* (2013.01); *B32B 2255/26* (2013.01); *B32B 2260/021* (2013.01); *B32B 2260/046* (2013.01); *B32B 2262/106* (2013.01); *C08J 2375/02* (2013.01)

(58) Field of Classification Search
CPC ............ B32B 2255/02; B32B 2255/26; B32B 2260/021; B32B 2260/046; B32B 2262/106; C08J 3/244; C08J 3/245; C08J 5/042; C08J 7/16; C08J 2375/02; C08J 2363/00; C09D 175/02
USPC ........................................................ 428/423.1
See application file for complete search history.

(56) References Cited

U.S. PATENT DOCUMENTS

| | | |
|---|---|---|
| 2010/0015452 A1 | 1/2010 | Helton |
| 2011/0192274 A1* | 8/2011 | Fingerhut ............ F41H 5/0435 89/914 |
| 2014/0099496 A1 | 4/2014 | Attard |
| 2019/0048127 A1 | 2/2019 | Kasemi |

OTHER PUBLICATIONS

Primeaux II, Dudley J., et al., "Polyurea vs Polyurethane & Polyurethane/Polyurea: What's the Difference?", Mar. 2-4, 2004, 2004 PDA Annual Conference, p. 12 (Year: 2004).

Zhou, Hongyu et al., "Crashworthiness characteristics of a carbon fiber reinforced dual-phase epoxy-urea hybrid matrix composite", Mar. 15, 2015, Composites Part B: Engineering, vol. 71, pp. 17-27 (Year: 2015).

Attard "International Journal of Solids and Structures" 42(21-22), 5656-5668 (2005).

Attard and Fafitis. Engineering Structures, 29(8), 1977-1989 (2007).

Attard and Mignolet, J. Engineering Mechanics, 134 (10), 881-891 (2008).

Attard et Al "Linking Nanoscale Chemical Changes to Bulk Material Properties in IEPM Polymer Composites Subject to Impact Dynamics" ACS appl. Mater Interfaces 2019, 11, 20404-20416.

Attard, "Molecular resiliency and chemical bond richness of inter facial epoxy-polyurea matrix linked to characteristics of glass transition temperature" Materials Today Communications 2019 1-11.

Attard, T.L., "Modeling of Higher-Mode Effects in Various Structures Using a Pushover Analysis," Doctorial Dissertation, Arizona State University, Tempe, Arizona (2003).

Filiatrault et al. , Engineering Structures, 25, 461-471 (2003).

Li He et al. "Integrating energy transferability into the connection-detail of coastal bridges using reinforced interfacial epoxy-polyurea reaction matrix composite" Composite Structures 216 (2019) 89-108.

Dow, "Epoxy Curing Agents Product Overview Guide", Feb. 10, 2016, p. 8 (Year: 2016).

\* cited by examiner

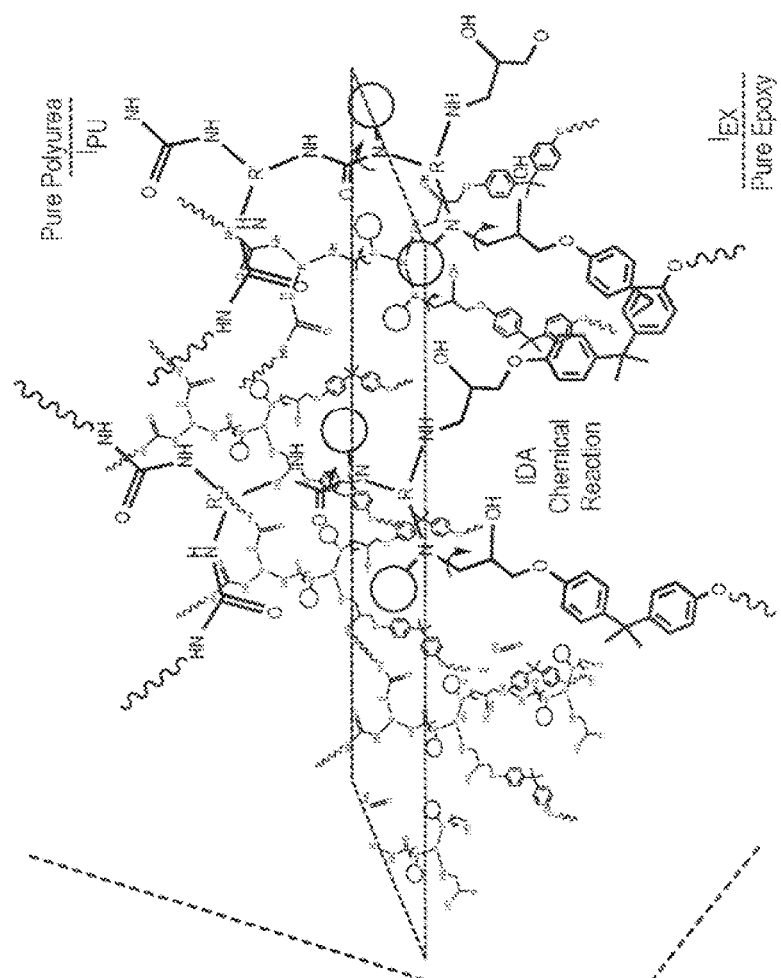
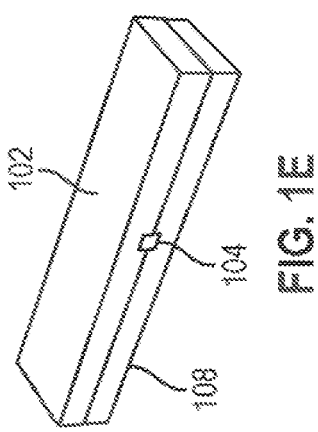
FIG. 1C
FIG. 1E
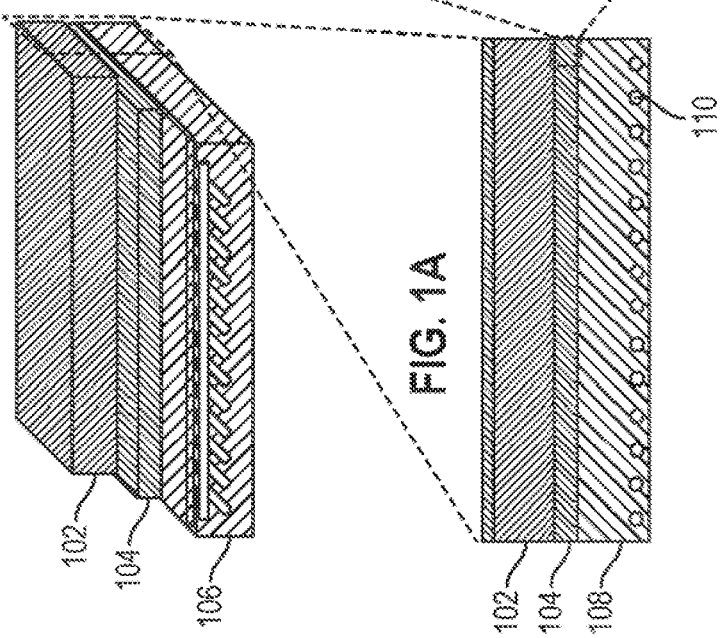
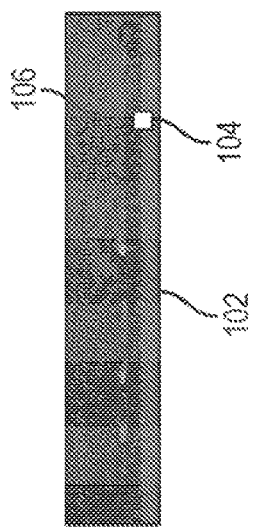
FIG. 1A
FIG. 1B
FIG. 1D

MOLECULARLY RESILIENT AND HIGH-ENERGY TRANSFERRABLE COMPOSITE MATERIALS AND METHODS OF REINFORCING SUBSTRATES WITH THE SAME

The present application is a Continuation of application Ser. No. 16/944,058 filed on Jul. 30, 2020, now U.S. Pat. No. 11,279,793 B2, which claims the benefit of U.S. Provisional Application No. 62/880,644 filed Jul. 30, 2019 and U.S. Provisional Application No. 62/886,329 filed Aug. 13, 2019; all of which are incorporated by reference herein.

FIELD OF THE DISCLOSURE

The present disclosure relates generally to composite, polymer, or polymer-composite materials, or just "composite materials," and more particularly to molecularly resilient and high-energy transferrable composite materials and methods of reinforcing substrates with the same.

BACKGROUND OF THE DISCLOSURE

Numerous design flexibility, with high-strength, high stiffness, chemical resistance, heat resistance, and low-weight makes fiber-reinforced epoxy (F/E) considered as an attractive materials design option for a multitude of structural components. However, the paucity of mechanical energy transfer, such as loss modulus and fracture toughness, of high-tenacity brittle fibers is often over-compensated by aggrandizing fiber quantity, which amplifies cost and predisposes fiber-reinforced polymers (FRP), including F/E, to unexpected failure.

For at least these reasons, various approaches have been made to enhance energy transferrable properties. One approach involves adding polyurea particles to the epoxy matrix to increase the stress intensity factor. However, this method can decrease the strength by 10% and introduce defects at the boundary due to low bond enthalpy and surface energy in immiscible admixtures. Another approach involves usage of nanoparticle reinforcement that creates cavitation, cracks tip blunting, and cracks deflection at the interface to deter crack propagation in the matrix (such as epoxy) and contributes to better interface-related properties. However, this engenders nanoparticle agglomeration because of the high surface-to-volume ratio of particles, which induces defects on the 'polymer matrix-filler' boundary and reduces material quality and mechanical performance, including FRPs.

Yet another approach involves the addition of coupling agents to facilitate chemical bonding between reinforcing nanoparticle surfaces dispersed homogeneously and toughens the polymer matrix, where barriers pin cracks and impede crack propagation. However, process complexity and high cost limit the number of treated nanoparticles. Yet another method involves tuning the composition of the polymer matrix using a synthesis of a block copolymer, e.g., PEO-based copolymers at low concentrations can toughen the epoxy matrix. However, copolymer synthesis is complex and expensive, and experimental conditions are harsh and prohibit efficaciousness in FRP application.

Other approaches or studies to improve C-F/E properties are topical treatments such as, hygroscopic treatment of C-F/E (interlaminar) interfaces, are invasive. Further, moisture absorption elicits matrix swelling, and conversely, thermal treatment results in matrix shrinkage and improves epoxy cross-linking.

Although the above-discussed disclosures help to produce a composite material, they have the identified and clearly demonstrated problems and limitations. Therefore, there is a need for providing molecularly resilient and high-energy transferrable composite material that overcome these and other deficiencies of the prior art.

BRIEF SUMMARY OF THE DISCLOSURE

The disclosed subject matter provides an epoxy or a composite including a fiber reinforced epoxy (F/E) layer, and a layer of polyurea moieties ("polyurea") coated on the surface of pre-curing or curing (wet) epoxy (or just "epoxy") to form a new interfacial epoxy-polyurea hybridized-matrix (IEPM) material. The IEPM material is formed between the epoxy on the surface of the F/E and the fully cured polyurea layer. The IEPM material is formed on coating of the pre-curing or curing (wet) epoxy layer on the fiber reinforced epoxy layer.

In one embodiment, the F/E layer is a carbon-fiber reinforced epoxy (C-F/E) layer. In one embodiment, the polyurea layer is a fire-resistant intumescent polyurea layer. In another embodiment, the polyurea layer is a fast-curing, fire-resistant intumescent polyurea layer.

In one embodiment, a method for reinforcing a substrate is disclosed. At one step, a substrate is provided. As generally described herein, the substrate can be made on any suitable material, such as wood, masonry (e.g., brick, stone, stucco, tile), concrete (such as concrete reinforced with steel or other metal), steel, FRP, such as F/E, or combinations thereof. At another step, the epoxy (a resin and hardener mixture) is added to at least a portion of the substrate, or it may be used to construct the F/E if the F/E is the substrate. In an embodiment, the epoxy (pre-curing or curing) is applied to the exterior faces of wood studs in the wood-frame homes. At another step, carbon-fiber fabric is applied over the epoxy. At another step, the epoxy is allowed to saturate.

At another step, a C-F/E on at least the portion of the substrate is formed. At another step, pre-curing or curing epoxy is applied to the C-F/E. During this step, unsaturated epoxy is allowed to reside on the surface of the C-F/E. Further, the epoxy may not be allowed to dry and become tacky, or it may be allowed to dry to become tacky for any amount of time after being applied to the surface of the C-F/E. This amount of time may be zero hours, one-half hour, one hour, two hours, or three hours. At another step, polyurea, in pre-polymerized form (its moieties) or before it cures to become full cured polyurea, is sprayed or somehow applied, which includes being brushed or drizzled, over the pre-curing or curing or tacky epoxy surface. In one embodiment, the polyurea is a 550D-FR polyurea, which is a fast-curing fire-resistant intumescent polyurea coating that has excellent chemical-resistivity and elastomeric properties with superior elongation of 480%.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

The present subject matter will now be described in detail with reference to the drawings, which are provided as illustrative examples of the subject matter as to enable those skilled in the art to practice the subject matter. It will be noted that throughout the appended drawings, like features are identified by like reference numerals. Notably, the FIGURES and examples are not meant to limit the scope of the present subject matter to a single embodiment, but other embodiments are possible by way of interchange of some or all of the described or illustrated elements and, further, wherein:

FIG. 1A exemplarily illustrates a construction of a composite having an interfacial epoxy-polyurea hybridized-matrix material bounded by a polyurea layer and a fiber reinforced epoxy layer, according to an embodiment of the present invention.

FIG. 1B exemplarily illustrates a cross-sectional view of the interfacial epoxy-polyurea hybridized-matrix material bound by the pure polyurea layer and the pure epoxy layer, according to an embodiment of the present invention.

FIG. 1C exemplarily illustrates the IEPM region bounded by the pure epoxy layer and the pure polyurea layer, according to an embodiment of the present invention.

FIG. 1D exemplarily illustrates the IEPM material bounded by the fiber reinforced epoxy layer and the polyurea layer, according to an embodiment of the present invention.

FIG. 1E exemplarily illustrates the IEPM material lying between the epoxy layer and the polyurea layer, according to an embodiment of the present invention.

DETAILED DESCRIPTION OF THE EMBODIMENTS

Definitions

Figure 2:
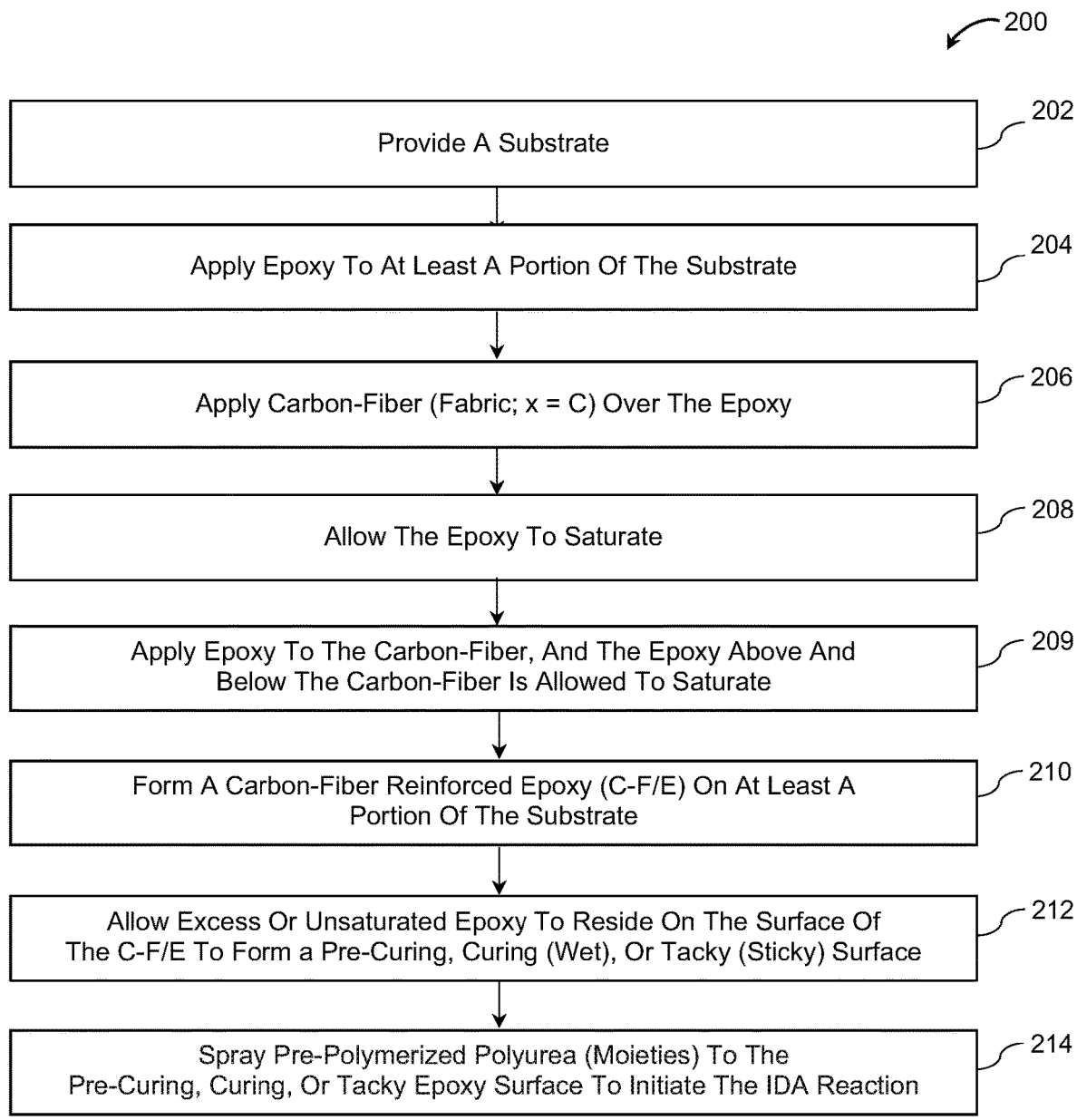
FIG. 2 exemplarily illustrates a method for reinforcing a substrate, according to an embodiment of the present invention.

While the following terms are believed to be well understood by one of ordinary skill in the art, the following definitions are set forth to facilitate explanation of the disclosed subject matter. Unless defined otherwise, all technical and scientific terms used herein have the same meaning as commonly understood to one of ordinary skill in the art which the presently disclosed subject matter belongs. Although the methods, devices, and materials similar or equivalent to those described herein can be used in the practice or testing of the presently disclosed subject matter representative methods, devices and materials are now described.

Following long-standing patent law convention, the terms "a", "an" and "the" refer to "one or more" when used in this application, including the claims. Thus, for example, the reference to "an additive" includes a plurality of such additives, and so forth. Unless otherwise indicated, all numbers expressing quantities of size, amount, elongation percentage, tensile strength, reaction conditions, and so forth used in the specification and claims are to be understood as being modified in all instances by the term "about." Accordingly, unless indicated to the contrary the numerical parameters set forth in this specification and attached claims are approximations that can vary depending upon the desired properties sought to be obtained by the presently disclosed subject mailer. As used herein, the term "about" when referring to a value or an amount of size, weight, concentration, time, or percentage is meant to encompass variations of, in some embodiments ±20%, in some embodiments ±10<x, in some embodiments ±51, in some embodiments ±1%, and in some embodiments, ±0.1% from the specified amount as such variations are appropriate to perform the disclosed methods.

The term "and/or" when used to describe two or more activities conditions, or outcomes refers to situations wherein both of the listed conditions are included or wherein only one of the two listed conditions are included. The term "comprising," which is synonymous with "including," "containing," or "characterized by" is inclusive or open-ended and does not exclude additional unrecited elements or method steps "Comprising" is a term of art used in claim language which means that the named elements are essential, but other elements can be added and still form a construct within the scope of the claim.

As used herein, the phrase "consisting of" excludes any element, step or ingredient not specified in the claim. When the phrase "consists of" appears in a clause or the body or a claim, rather than immediately following the preamble, it limits only the element set forth in that clause; other elements are not excluded from the claim as a whole. As used herein, the phrase "consisting" essentially or limits the scope of a claim to the specified materials or steps, plus those that do not materially affect the basic and novel characteristic(s) of the claimed subject mailer. With respect to the terms "comprising", "consisting of," and "consisting essentially of," where one of these three terms is used herein, the presently disclosed and claimed subject matter can include the use of either or the other two terms.

The term "fiber" generally refers to an elongated body the length dimension of which is much greater than the transverse dimensions of width and thickness. Although using "chopped" or "short" fiber will drastically reduce the ratio between the length dimension and the transverse dimensions, the term "fiber" will be used herein for consistency. The term fiber includes either manufactured or natural monofilament, multifilament ribbon, strip, staple and other forms of chopped, cut or discontinuous fiber and the like having regular or irregular cross-section. The term "fiber" includes a plurality of any of the foregoing or a combination thereof. In some embodiments, the cross-sections of the fibers may be circular, or oblong. They may be irregular or regular multi-lobal cross-section having one or more regular or irregular lobes projecting from the linear or longitudinal axis or the fibers. The term "fiber" also refers to a fabric or fabric sheet that is constructed from fibers that may be used in the current application.

High tenacity fibers are fibers that have high ultimate tensile strength and a high modulus of elasticity (e.g., a high Young's modulus or tensile modulus). High tenacity fibers include, but are not limited to, highly oriented, high molecular weight polyolefin fibers, particularly high modulus polyethylene fibers and polypropylene fibers; aramid fibers; polybenzazole fibers such as polybenzoxazole (PBO) and Polybutylene terephthalate (PBT); polyvinyl alcohol fibers: polyacrylonitrile fibers: liquid crystal copolyester fibers; glass fibers; carbon fibers: basalt or other mineral fibers: as well as rigid rod polymer fibers; and mixtures and blends thereof. In some embodiments, the high tenacity fiber is carbon fiber, glass fiber (e.g., e-glass or s-glass), aramid (e.g., meta- or para-aramid), liquid crystal copolyester fiber, basalt fiber or a combination thereof. Fabrics including high tenacity fibers can include a network or fibers in the form of a woven, knitted or a non-woven fabric. In some embodiments, at least 50% by weight of the fibers in the fabric are high tenacity fibers. In some embodiments, at least about 75% by weight of the fibers in the fabric are high tenacity fibers. In some embodiments, substantially all or the fibers in the fabric are high tenacity fibers.

The fabrics of the presently disclosed subject matter can comprise one or more different high tenacity fibers. In some embodiments, the yarns in the fabric can be essentially parallel in alignment. In some embodiments, the yarns can be twisted over-wrapped or entangled. The fabrics of the presently disclosed subject mailer can be woven with yarns having different fibers in the warp and weft directions, or other directions. As used herein, a "monomer" refers to a molecule that can undergo polymerization, thereby contributing constitutional units (i.e., an atom or group of atoms) to the essential structure of an oligomer or polymer.

An "oligomer" refers to a molecule of intermediate relative molecular mass, the structure of which includes a small plurality of units (e.g., between about 2 and about 10 repeating units) derived from molecules of lower relative molecular mass. A "polymer" refers to a molecule including a plurality of repeating units derived from smaller molecules (e.g., monomers or oligomers). In some embodiments, the polymer has more than 10 repeating units, more than 25 repeating units, more than 50 repeating units, or more than 100 repeating units. In some embodiments, a polymer can have more than 1,000, more than 5,000, more than 10,000, more than 50,000, more than 100,000 repeating units, or more than 250,000 repeating units. A "copolymer" refers to a polymer derived from more than one species of monomer.

The term "prepolymer" refers to a monomer, oligomer or short-chain polymer with reactive terminal groups (e.g., polyurea, specifically its moieties, or epoxy, specifically during its pre-curing, curing, or tacky states, ester, the carboxylic acid (or carboxylate), hydroxyl, vinyl, or amine groups) that can react to form a larger (e.g., higher molecular weight) polymer or copolymer. In some embodiments, "short-chain polymer" refers to a polymer with 1,000 repeating units or less (e.g., 1,000, 750, 500, 400, 300, 200, 150, 100, 75, 60, 50, 40, or 30 repeating units or less). In some embodiments, a short-chain polymer has molecular weight of less than 10,000 g/mol (e.g., less than 10,000, 7,500, 5,000, 4,000. 3,000, 2,000, or 1,000 g/mol).

The term "resin" or "polymer resin" as used herein refers to a composition including one or more polymeric, oligomeric or monomeric materials that can be hardened by polymerization. Thus, in some embodiments, a resin is a viscous liquid composition that can be polymerized to form a solid. Suitable resins include but are not limited to epoxy resins, vinyl ester resins, polyester resins and methyl methacrylate resins.

The hardening (or further polymerization) of the resin can also be referred to as "curing." In some embodiments, the curing requires a polymerization initiator. e.g., an organic peroxide. In some embodiments, the level of curing is dependent on time and temperature. In some embodiments, "curing" refers to partial curing, e.g., wherein the further polymerization of the resin is allowed to proceed to about 10%, 20%, 30%, 40%, 50%, 60%, 70%, 80%, or 90% completion (i.e., leaving about 90%, 80%, 70%, 60%, 50%, 40%, 30%, 20%, or about 10% unreacted polymerizable groups as compared to the percentage or polymerizable groups present in the resin prior to curing). The term "tacky" as used herein refers to a partially cured resin, e.g., a resin wherein some level of polymerization of the original resin has occurred but wherein there are still unreacted, polymerizable groups available. The term "pre-curing" as used herein refers to an uncured resin that has not started to cure or that has very minimally started to cure, wherein polymerization of the resin is at 0% or is at nearly 0%.

The term "polyurea" refers to a polymer including multiple urea bonds (i.e., bonds having the structure —NR—C(=O)—NR—, wherein R is alkyl or aryl). Polyurea can be formed by the reaction of isocyanate-terminated prepolymers and amine-containing components (e.g., amine-terminated polymer resins, amine-lerminated oligomers, or amine-containing monomers). "Pre-polymerized" polyurea refers to the moieties, or functional groups, of the prepolymer polyurea and prior to the completion of polymerization. The term "isocyanate" refers to the group —N=C=O. The term "amine" refers to the group —NR'R", wherein R' and R" are independently H, alkyl or aryl. "Primary amines" are compounds wherein both R' and R" are H. "Secondary amines" are compounds wherein one of R and R" is H and the other is alkyl or aryl.

As used herein, the term "alkyl" refers to inclusive. linear (i.e., "straight-chain"), branched, or cyclic, saturated or at least partially and in some cases fully unsaturated (i.e., alkenyl and alkynyl) hydrocarbon chains, including for example. methyl, ethyl, propyl, isopropyl, butyl, isobutyl, tert-butyl, pentyl. hexyl, octyl. ethenyl, propenyl, butenyl, pentenyl, hexenyl, octenyl, butadienyl, propynyl. butynyl, pentynyl. hexynyl, heptenyl, and allenyl groups. "Branched" refers to an alkyl group in which a lower alkyl group, such as methyl, ethyl, or propyl, is attached to a linear alkyl chain. "Lower alkyl" refers to 10 an alkyl group having I to about 8 carbon atoms (i.e., a Cl. alkyl). e.g., 1, 2, 3, 4, 5, 6, 7, or 8 carbon atoms. "Higher alkyl" refers to 10 an alkyl group having about 10 to about 20 carbon atoms, e.g., 10, 11, 12, 13, 14, 15. 16, 17, 18, 19, or 20 carbon atoms. In certain embodiments, "alkyl" refers, in particular, to C1-6 straight-chain alkyls. In other embodiments, "alkyl" refers to C1-6 branched-chain alkyls.

Alkyl groups can optionally be substituted with one or more alkyl group substituents, which can be the same or different. The term "alkyl group substituent" includes but is not limited to alkyl, halo, arylamino, acyl, hydroxyl, aryloxyl, alkoxyl, alkylthio, aralkyloxyl, carboxyl, alkoxycarbonyl, oxo, and cycloalkyl. There can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

The term "aryl" is used herein to refer to an aromatic substituent which can be a single aromatic ring or multiple aromatic rings which are fused, and linked covalently or linked to a common group such as a methylene or ethylene moiety. The common linking group can also be a carbonyl as in benzophenone or oxygen as in phenyl ether or nitrogen in diphenylamine. The aromatic ring(s) can include phenyl, naphthyl, biphenyl, diphenylether, diphenylamine, and benzophenone among others. In particular embodiments, the term aryl means a cyclic aromatic including about 5 to about 10 carbon atoms including 5- and 6-membered hydrocarbon and heterocyclic aromatic rings.

The aryl group can be optionally substituted with one or more aryl group sub stituents which can be the same or different, where "aryl group substituent" includes alkyl, aralkyl, hydroxy, alkoxyl. aryloxy, aralkoxyl, carboxy, alkoxycarbonyl, aryloxycarbonyl, aralkoxycarbonyl, Acyloxyl, Acylamino, aroylamino, carbamoyl, alkylcarbamoyl, dialkylcarbamoyl, arylthio, alkylthio, alkylene and —NR' R", where R' and R" can be each independently hydrogen. alkyl, aryl, and aralkyl.

Specific examples or aryl groups include but are not limited to eye lopentadienyl, phenyl, thiophene, pyrrole, pyran. pyridine, imidazole, isothiazole, isoxazole, pyrazole, pyrazine. pyrimidine, and the like. The term "microspheres" refers to particles having at least one dimension less than about 1000 microns. In some, but not all, embodiments. microspheres are essentially spherical and have a diameter or less than about 1000, 750, 500, 400, 300, 200, 100, 75, 50, 25, 10, 5, or I microns. In some embodiments, microspheres can be irregular in shape or have a rod-like, disc, or cubic shape.

Composites

The disclosed subject matter provides a material or composite including a fiber reinforced epoxy (F/E) layer and an isophorone diisocyanate amine (IDA) reaction following pre-polymerized polyurea layer coated on the epoxy layer—that may or may not constitute the fiber reinforced epoxy—to form an interfacial epoxy-polyurea hybridized-matrix (IEPM) material. The IEPM material is bounded between the epoxy layer (which may be on an F/E layer) and the polyurea layer. In one embodiment, the fiber reinforced epoxy layer is a carbon fiber reinforced epoxy layer (C-F/E). In one embodiment, the polyurea layer is a fire-resistant intumescent polyurea layer. In another embodiment, the polyurea layer is a fast-curing, fire-resistant intumescent polyurea layer.

Referring to FIG. 1A, the composite includes an interfacial IEPM material 104 that lies between polyurea layer 102 and carbon fiber reinforced epoxy (C-F/E) layer 106. A unique IDA surface modification of the overlying pre-curing or curing epoxy layer 108 in FIG. 1B that has not saturated the fiber 110 and that resides on the epoxy-saturated C-F/E layer 106 produces the IEPM material 104. FIG. 1B exemplarily illustrates a cross-sectional view of the interfacial epoxy-polyurea hybridized-matrix material 104 bound by polyurea layer 102 and fiber-reinforced epoxy (F/E) layer 106, according to an embodiment of the present invention. Further illustrates, fiber 110 saturated in epoxy 108.

Referring to FIG. 1C, IEPM 104 region is bounded by pure polyurea ($I_{Pu}$) layer 102 and pure epoxy ($I_{Ex}$) layer 108 which is also the "excess" epoxy that does not saturate the fiber. IEPM 104 region is an interfacial IDA chemical reaction between migrating epoxy species during pre-curing or curing and either slow reacting, fast-reacting, or dissociation reactions of polyurea moieties. IEPM 104 contains unique chemistry, including the specific type and degree of chemical bonding, nano-scale topography, and width (μm), resulting in unique chemical bond richness across IEPM 104 region between $I_{Ex}$ and IN. IEPM material 104 is a region of width that ranges from 2 μm to 50 μm and is composed of chemical bonds and may also include physical mixtures. The width of IEPM 104 depends on factors such as thermodynamic processing and diffusivity of migrating species. The reaction time, $t_c$, in hours (h) defines the time or duration after completion of mixing of reacting agents composed of the epoxy species at which time pre-polymerized polyurea (or as a prepolymer) is applied. $t_c$=0 hours is defined as a period of pre-curing. IEPM 104 provides large-impact dynamics resistance and to F/E or to structures reinforced or strengthened by F/E.

In one embodiment, the molecular vibrational properties of IEPM 104 may be dialed-in and tuned depending on the desired performance of the object being reinforced or strengthened by the composite that is expected to experience extreme forces. IEPM 104, if applied to conventional fiber (x)-reinforced epoxy (F/E), engenders an x-hybrid-polymeric "matrix" composite system (x-IEPM-$t_c$). IEPM 104 composes the x-IEPM-$t_c$ composite system that may or may not contain reinforcing fiber ("x"). In x-IEPM-t "x" may be defined as a fiber or a fibrous composite that may or may not have high-tenacity, and $t_c$ as the reaction time. Referring to FIG. 1D, the fiber ("x") may be a load-bearing fiber, such as carbon fiber (x=C). If glass fiber is used, then x=G is designated. Referring to FIG. 1E, if no fiber is used, then x=0 is designated.

Method for Reinforcing Substrates

FIG. 2 exemplarily illustrates a method 200 for reinforcing a substrate according to an embodiment of the present invention. At step 202, a substrate is provided. As generally described herein, the substrate can be made of any suitable material, such as wood, masonry (e.g., brick, stone, stucco, tile), concrete (concrete reinforced with steel or other metal), steel, FRP, including F/E, or combinations thereof. At step 204, epoxy is added to at least a portion of the substrate. In an embodiment, the epoxy is applied to the exterior faces of wood studs in the wood-frame homes. In another embodiment, the epoxy is applied to the exterior faces of concrete girders in coastal bridges. At step 206, the carbon-fiber fabric is applied over the epoxy. At step 208, the epoxy is allowed to saturate. At step 209, the epoxy (pre-curing or curing) is applied to the carbon-fiber. The epoxy from above and below the carbon-fiber fabric is allowed to saturate the carbon-fiber fabric. At step 210, a carbon-fiber reinforced epoxy (C-F/E) on at least the portion of the substrate is formed. At step 212, pre-curing or curing epoxy is applied to the C-F/E. Further, the construction may not be allowed to dry at all to physical touch at about 0 hours; or it may be allowed to begin to dry but remain wet at about one-half hour or one hour; or it may be allowed to become tacky at about two hours or three hours. At step 214, polyurea prepolymer (polyurea moieties) is spayed over the pre-curing, curing, or tacky epoxy surface to initiate the IDA reaction. In one embodiment, the polyurea is a 550D-FR polyurea, which is a fast-curing fire-resistant intumescent polyurea coating that has excellent chemical-resistivity and elastomeric properties with superior elongation of 480%.

Chemical Construction of IEPM-$t_c$ Material and the IDA Modification

In one embodiment, the IEPM material resides on the carbon-fiber reinforced epoxy (C-F/E) layer and lies between the C-F/E layer and the pure polyurea layer. In another embodiment, the IEPM does not reside on any fiber. However, the x-IEPM-$t_c$ composite includes polyurea and may (x≠0) or may not (x=0) include a fiber (x). In one embodiment, atomic force microscopy (AFM) and scanning electron microscopy (SEM) are utilized to elucidate interfacial nanoscale morphology and chemical structures via the reaction kinetics of the curing or pre-curing epoxy (as a function of time, $t_c$) and the slow-reacting or fast-reacting polyurea moieties (polyurea as a prepolymer), or dissociation reactions of polyurea.

In one embodiment, the IEPM material has a physical width of 2 μm to 50 μm. In another embodiment, the IEPM material, comprising the x-IEPM-$t_c$ composite, that resides between the polyurea and the epoxy, includes a unique gradual "beach-pebble" topography that transitions between the rough polymerized (cured) polyurea segment and the smooth (cured) epoxy segment. The result is validated utilizing infrared spectral analysis using a Nano-IR2 instrument with a laser tip size of 80 nmr chemical wavenumber mapping, non-negative matrix factorization modelling, thermomechanical analysis, dynamic mechanical analysis, and nano-indentation. In yet another embodiment, the IEPM material includes necessary chemical bonds and bond enthalpies in the IEPM to engender specific molecular vibrational properties.

In one embodiment, the IDA surface modification of the reactive epoxy is configured to produce the IEPM material. The modification takes place before the epoxy has fully cured, or while functional groups remain unreacted. The pre-curing, curing, or sometimes tacky epoxy surface that resides on the substrate, which may be a structural substrate. In one embodiment, the substrate may be concrete, steel, timber, carbon fiber, including pre-curing, curing, or cured C-E/E, which is one type of FRP, or any low- or high-tenacity fiber denoted as x-F/E, where x=0 indicates absence of fiber. In one embodiment, the IDA surface modification of the epoxy occurs via interruption of the epoxy reaction. In one embodiment, the epoxy surface is curing during surface modification. In another embodiment, the epoxy surface may be pre-curing during surface modification.

Figure 3A:
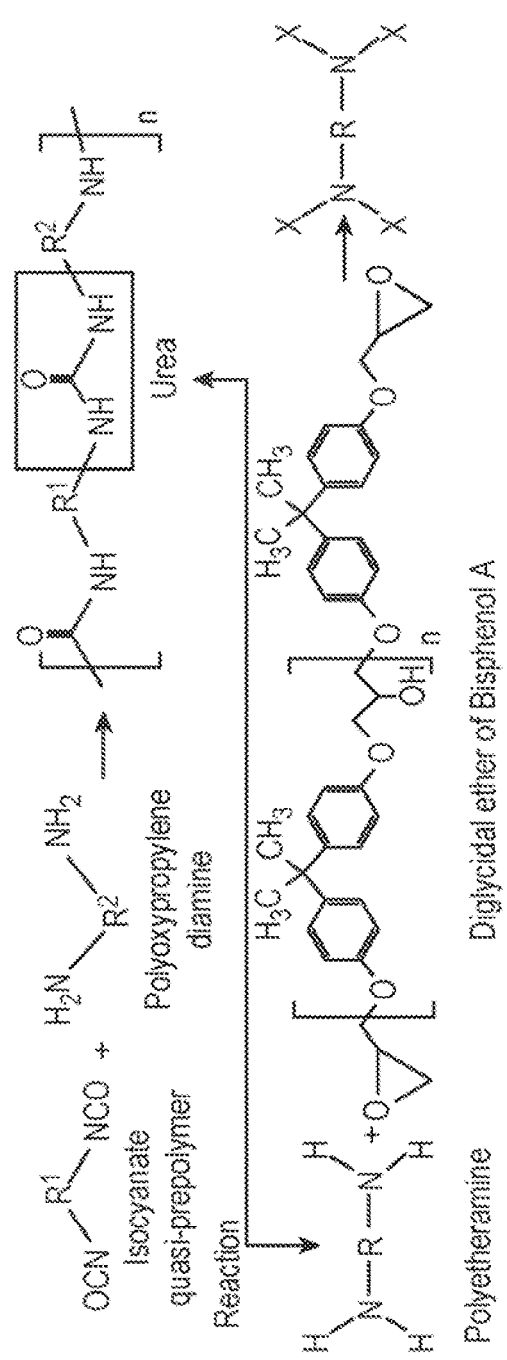
FIG. 3A exemplarily illustrates the pre-polymerization of polyurea interrupted by exchange reaction with (—$NH_2$)-epoxy (hardener; amine functional group that is used to harden the epoxy resin that results in "epoxy"), according to an embodiment of the present invention.
Figure 3B:
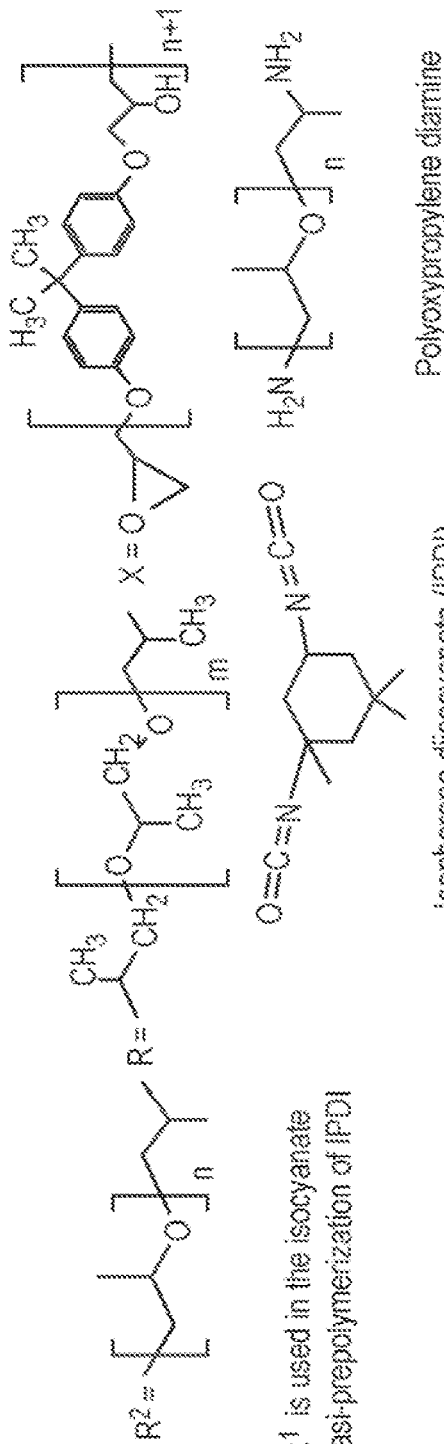
FIG. 3B exemplarily illustrates the curing reaction of epoxy, according to an embodiment of the present invention. The curing reaction may be in pre-curing form (when the resin and hardener were just, or very recently, mixed), curing form (wet), or tacky form (physically sticky to the touch).
Figure 3C:
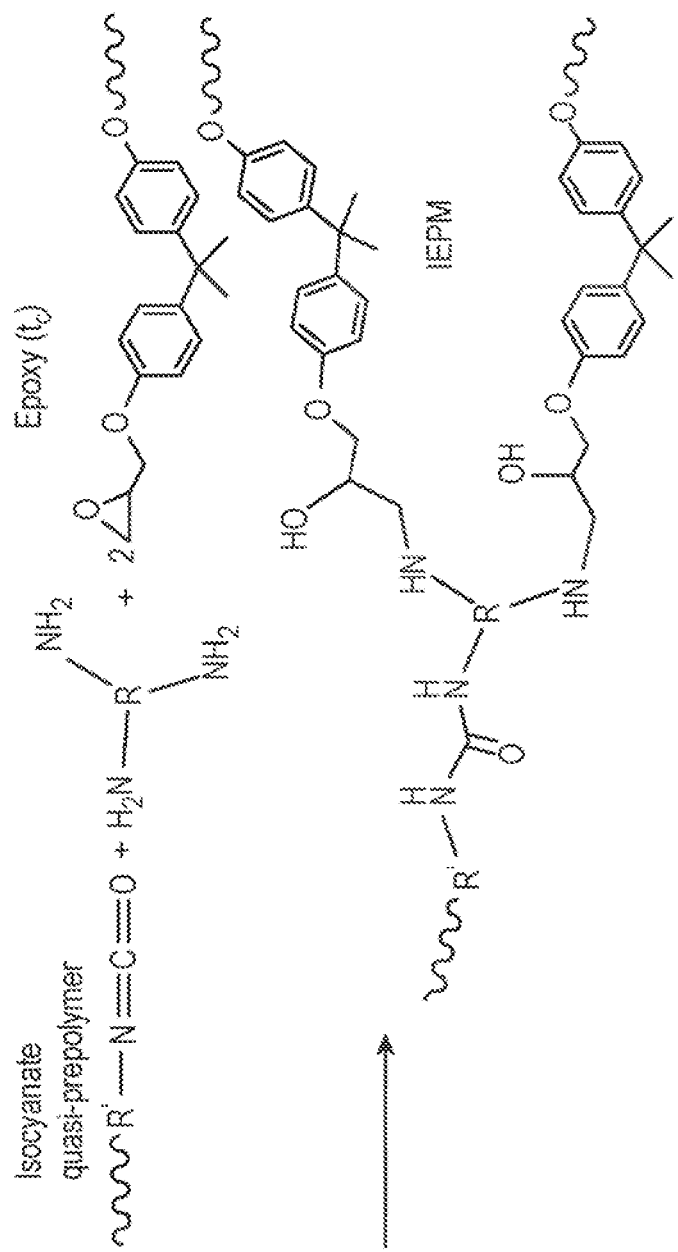
FIG. 3C exemplarily illustrates isophorone diisocyanate amine (IDA) reaction that produces the ultrathin IEPM, according to an embodiment of the present invention.

Referring to FIG. 3A, the epoxy surface modification occurs when an isocyanate functional group of the urea chemical structure, reacts with amine functional groups of the pre-curing or curing or even tacky epoxy. The isocyanate functional groups may be the result of an isophorone diisocyanate quasi-prepolymer and polyoxypropylene diamine reaction to form unique urea bonds. This chemical exchange reaction results in IDA surface modification. The isophorone diisocyanate—polyoxypropylene diamine reaction produces the unique urea bonds. Referring to FIG. 3B and FIG. 3C, following the IDA modification, a three-part reaction of epoxide, amine (from the epoxy's hardener), and isocyanate (—NCO) functional groups produces new epoxy-urea chemical bonds and forms the IEPM material. The structure of the IEPM material is shown in FIG. 3C. In one embodiment, the chemical reaction is not between the urea bonds and amine moieties of polyurea which may compose the resin portion of conventional the polyurea prepolymer.

In one embodiment, the modification of the surface of the epoxy is the result of isophorone diisocyanate, or a molecule with isocyanate functional groups, reacting with the amine functional groups of the migrating epoxy species to modify the epoxy chemistry before (pre-) or during epoxy curing. The IDA modification refers to using the urea prepolymer molecule produced via reaction of isophorone diisocyanate quasi prepolymer with polyoxypropylene diamine to modify the pre-curing or curing epoxy reaction via the amine functional group (of the epoxy). The modified epoxy surface is also referred to as an IDA-modified epoxy surface. The isocyanate (—NCO) functional groups react with the amine functional group (—$NH_2$) from the pre-curing or curing epoxy.

Depending on the number of epoxy chemical reactions at time t=$t_c$ when the urea molecules containing (—NCO) functional groups begin to react with the pre-curing ($t_c$=0), curing (0.5≤$t_c$≤1.5), or tacky (1.5<$t_c$<24) epoxy, the IEPM material, or interfacial epoxy-polyurea matrix, shown in FIG. 1C, includes molecular vibrational characteristics that are linked to bulk energy transferability. The IEPM (or IEPM-$t_c$) material relies on IDA optimal functional group reactivity between —(NCO), —($NH_2$)— (from epoxy), and epoxide to modify the surface of the epoxy to maximize the bond strength of the IEPM and to dial-in requisite bond-motion modes for various applications. In one embodiment, wood-frame homes repercuss 2×4 wood studs (wind-borne debris) during an EF-5 tornado. In another embodiment, concrete coastal bridges withstand large surge and lateral wave forces during major hurricanes. The $NH_2$ (amine) functional group from epoxy may be, for example, polyetheramine, which may react with an epoxide to produce conventional epoxy that is used in x-F/E, which includes C-F/E.

In one embodiment, the IDA reaction introduces physiomechanical, adhesion and physiochemical properties via the urea carbonyl stretching mode (1642 cm$^{-1}$; bond enthalpy ΔH=745 kJ/mol) and the N—H bending mode (1550 cm$^{-1}$; ΔH=391 kJ/mol) via reaction involving isophorone diisocyanate, polyoxypropylene diamine, and polyetheramine. The polyetheramine also reacts with the epoxide to produce epoxy. The IDA reaction produces the IEPM material that provides a library of bulk material properties that may be designed and integrated into several structures experiencing extreme forces.

In one embodiment, the IEPM construction includes polyurea moieties, specifically urea chemical bonds that include isocyanate functional groups. In one embodiment, the isophorone diisocyanate quasi prepolymer reacts with (—NH$_2$)-epoxy (from epoxy) to produce urea molecules. In one embodiment, the aliphatic polyurea moieties also facilitate the IDA reaction. In one embodiment, the IEPM may include an isophorone diisocyanate quasi pre-polymer. In another embodiment, the IEPM may include polyoxypropylene diamine molecules. The IDA reaction that is specifically based on aliphatic polyurea moieties and the isophorone diisocyanate and polyoxypropylene diamine molecules is critical in the production of a high-quality IEPM material.

The epoxy also contributes to the IDA chemistry and also serves as the structural (coupling) link between x-F/E and IEPM that helps to introduce the loss modulus property to the x-IEPM-$t_c$ composite. The exchange reactions between isophorone diisocyanate and epoxy-based amine, which contain additives to accelerate the reaction rate of pure epoxy, partially supplant (as a function of lowering $t_c$) the reaction between isophorone diisocyanate and polyurea-based amine. The significant presence of polyetheramine (—NH$_2$) and epoxide groups (due to fast diffusivity of epoxy species) conduces a large number of reactions with isocyanate groups, specifically from sophorone diisocyanate and polyoxypropylene diamine, to produce a high-quality IEPM. In one embodiment, the IDA reaction is a 1,4-addition carbonyl-stable isocyanate accepting epoxy modification. In one embodiment, the IDA reaction significantly enhances energy absorption and fracture toughness of x-IEPM-$t_c$.

In one embodiment, epoxy-based (—NH$_2$) nucleophile is used to accelerate the IDA reaction between (—NCO) and epoxide to facilitate carbonyl stability. In another embodiment, the carbonyl stability in the IEPM is facilitated by not using a polyol nucleophile (that reacts with the isocyanate-based functional group) to create a fast irreversible, i.e., kinetically controlled, nucleophilic reaction at the carbonyl carbon that would add hydrogen to the carbonyl oxygen and may make the epoxy surface undesirably hydrophilic (—OH). The existence of the carbonyl group is verified via IR spectral analysis.

In one embodiment, an epoxy-based (—NH$_2$) nucleophile facilitates the reversibility of a potential 1,2-addition, therefore evincing a state of thermodynamic control that allows the 1,4-addition to dominate. Nucleophile attack at the carbon β then desirably transmits the electrophilic character of the carbonyl carbon to the carbon (3 while also adding a hydrogen atom to the carbon β. The retention of carbonyl stability (C=0 bond enthalpy, ΔH, is 745 kj/mol) signifies a high-quality high-enthalpy bonded IDA-modified epoxy surface that includes C—C (ΔH=347 kj/mol) and C=C (ΔH=620 kj/mol) stretching of aromatic rings. The result is revealed from epoxy IR spectra and linked micro mechanically to the presence of larger $E_r$, or reduced elastic modulus. Further, the N—H bending (ΔH=393 kj/mol) and C—N (ΔH=276 kJ/mol) stretching modes are also revealed via polyurea IR spectra.

Referring to FIG. 1E, the chemical bonding of the IEPM and the epoxy layer introduces substantial resiliency and crack-tip opening displacement (for nonlinear materials) in otherwise brittle epoxy, therefore minimizing crazing and crack bridging in C-F/E substrates and leading to the high-strength sustainability of composite structures.

Parameter $t_c$

The parameter $t_c$ is a thermodynamic processing parameter that controls the diffusivity of the migrating epoxy species before reacting with the polyurea moieties. In one embodiment, the parameter $t_c$ helps to facilitate the IDA chemical reaction. In another embodiment, the parameter $t_c$ controls the diffusivity of the migrating epoxy species. In yet another embodiment, the parameter $t_c$ controls the diffusivity of the epoxide and amine moieties. Further, a cogent link exists between the chemically bonded structures in IEPM and $t_c$.

The importance of $t_c$ is more discernable in structures that have been strengthened or reinforced with x-IEPM-$t_c$ and that are placed under extreme duress, for example subjected to high-impact forces, including hurricane and ballistic, than in structures that have been strengthened or reinforced with x-IEPM-$t_c$ and subjected to less extreme/less dynamic environments. In one embodiment, lower $t_c$ is used to produce IEPM that enhances bulk energy transferability. In another embodiment, the IEPM produced using lower $t_c$ enhances post-elastic energy absorption characteristics and introduces internal "damage barriers" to improve fracture toughness of the x-F/E, or C-F/E. Properties such as loss modulus and fracture toughness are quantitative measures of bulk energy transferability.

In one embodiment, the loss modulus of x-IEPM-$t_c$ improves with lower v and through the use of aliphatic polyurea moieties to produce the new IEPM material via IDA epoxy surface modification. In one embodiment, $t_c$=0 refers to a state of epoxy that is "pre-curing," i.e., when the epoxy has been "just-mixed" at which point IDA-modification occurs at $t=t_c$ (hours) when polyurea moieties are applied to the surface. A state of epoxy that is "curing" refers to 0.5<$t_c$≤1.5. A state of "fully cured" epoxy is indicated by $t_c$=24. For x-IEPM-$t_c$<24, where $t_c$<24, defines the condition necessary for IDA surface modification of the pre-curing or curing or tacky (1.5<$t_c$<24) epoxy. Further, sample x-IEPM-$t_c$<24 has unique characteristics of the glass transition temperature ($T_g$).

In one embodiment, the IEPM can provide safe outlets for the sudden release of load-induced energy, e.g., ballistic loading. Thus, the IEPM material creates damage barriers in the x-F/E fibrous composite that blunt damage paths. The internal redistribution of stresses/forces in x-F/E and in structures reinforced or strengthened using x-IEPM-$t_c$ minimizes crack propagation and maximizes fracture toughness. The IEPM localizes cracks, reduces the extension of existing cracks, and reduces the likelihood of the formation of other regional cracks in the x-F/E and in structures reinforced or strengthened using x-IEPM-$t_c$. The reduction in stress concentrations in x-F/E and in structures reinforced or strengthened using x-IEPM-$t_c$ also indicates that failure modes, such as buckling in x-F/E or structures reinforced or strengthened using x-IEPM-$t_c$, become altered because individual microscale damage events cannot bridge together.

Further, for smaller $t_c$, e.g., $t_c=0$, the chemical structures of the IEPM-$t_c$ contain unique molecular vibrational modes that provide essential damping and fracture toughness properties to x-IEPM-$t_c$ and to the structures that the x-IEPM-$t_c$ composite reinforces or strengthens. Conversely, the density and distribution, i.e., the chemical "richness," of epoxy and polyurea chemical bonds in the IEPM material as indicated by their characteristic wavenumbers reduce significantly as $t_c$ increases. Further, as $t_c$ increases, the presence of physical mixtures increases, the IEPM quality (as a function of voids or defects) decreases, the bond strength of IEPM to the overlying epoxy and to the x-F/E decreases, and the bond strength of x-IEPM-$t_c$ to the structure or substrate that it reinforces or strengthens decreases. The chemical bond richness of the ultrathin IEPM in FIG. 3C is defined by the distribution of the chemical structures that compose the IEPM and its characteristic molecular vibrational properties and bond enthalpies as a function of $t_c$. The IDA surface modification, controlled by $t_c$, minimizes surface moisture-absorption, supplies essential strength sustainability, resiliency, and ductility to the x-IEPM-$t_c$ and to the structures that are reinforced or strengthened using x-IEPM-$t_c$.

In one embodiment, the number of reactions facilitated by $t_c$ between the (—NH$_2$)-epoxy and the (—NCO) groups is increased to incorporate more (—NH$_2$)-epoxy functional groups in the IDA reaction. This increases $E_r$ and its distribution across the IEPM. In one embodiment, as $t_c$ increases, bond enthalpy, $E_r$, density and distribution of chemical bonding and width of IEPM, decrease; and IEPM bond strength reduces. For example, sample IEPM-$t_c$=2.5 has IEPM width≤2 μm. Further, when no chemical reaction occurs at the epoxy-polyurea boundary ($t_c$=24) if epoxy has been allowed to fully cure (for example, for 24 hours), the interface between epoxy and polyurea is only a physical mixture, is without chemical bonding, is without IEPM formation, introduces only elastic properties via the elastomeric polyurea to the x-F/E and to the structure being reinforced or strengthened by the x-IEPM-$t_c$, introduces relatively insignificant damping, and is prone to fracturing even during the microtome process during sample preparation.

Bulk Energy Transferability of X-IEPM-$t_c$

The IDA/IEPM technology enhances mechanical energy transferability in low or high tenacity fiber constructions. The enhancement of mechanical energy transferability refers to a material's ability to reduce damage or elastic deformation due to a physical force by using an IEPM construction to dial-in fracture toughness and material damping. In one embodiment, the epoxy-surface modification by isophorone diisocyanate amine (IDA) reaction, which produces the x-IEPM-$t_c$ composite system, greatly improves energy transferability in damaged structures that have been retrofitted or undamaged structures that have been strengthened. The vulnerability of the fiber/matrix interface—between the fiber (x) and the impregnated epoxy—to microscopic damage is also minimized.

More general conventional carbon-FRPs (C-FRPs) and aramid-FRPs are also attractive design options to many engineering applications due to their design flexibility. Microscopic damage to fiber (x)/matrix (epoxy) interfaces may lead to catastrophic failure of the x-F/E system or to the structure retrofitted by the x-F/E composite. Without a remediate solution, mechanical energy transferability remains a lofty design parameter. Although the IDA surface modification that produces x-IEPM-$t_c$ contributes a small increase in strength compared to x-F/E, the IDA surface modification integrates tremendous bulk energy transferability via energy absorption/dissipation to sustain the high-strength of high-tenacity ("x") brittle fibers by localizing damage, enhancing structural ductility or post-elasticity in structures reinforced or strengthened using x-IEPM-$t_c$, and making them resilient against large environmental forces.

The motivation behind the IDA surface modification is sustaining the high-strength of high-tenacity fibrous composites, such as x-F/E, which is achieved by enhancing resiliency via nonlinear fracture toughness and material damping. The increase in structural resiliency results in a large structural ductility that includes compression-loaded structures and tension-loaded structures. The ability to sustain the high-strength or low-strength in brittle x-F/E composites, close to their peak strength indicates that surface modification by IDA, substantially more prominently at $t_c$=0, introduces nonlinear fracture toughness to the composite that minimizes the vulnerability of individual damage events to x-F/E, where x may be Carbon (C).

The results are supported by the chemical bond richness of IEPM-$t_c$ following the IDA-modification of the epoxy surface. The chemical bond richness or density and distribution across the width of the ultrathin IEPM material is unique for IEPM designed using $t_c$=0, $t_c$=0.5, and $t_c$=2.5, which are designated as IEPM-$t_c$=0, IEPM-$t_c$=0.5, and $t_c$=2.5, respectively. The chemical bond richness also depends on factors such as $t_c$, epoxy-resin viscosity (v), and polyurea moieties. The nanoscale changes to the IEPM are linked to bulk properties, including $E_r$, loss modulus, and fracture toughness, or, in general, energy transferability, where energy transferability oc $t_c^{-1}$. For IEPM that is engendered using larger values of $t_c$, the contribution of energy transferability via IDA surface modification decreases, the relative viscoplastic influence to the overall energy absorption increases, the IEPM width decreases by over 96% (from 50 μm to less than 2 μm wide), and the IEPM region is increasingly composed of physical mixtures instead of chemical bonds. This results in physical microgaps between the epoxy and polyurea, and causes the x-IEPM-$t_c$ composite to easily separate because of the weak physical mixtures, relative to the strong chemical bonds. Further, the ease-of-separation indicates that there had been a decrease in epoxy diffusivity, a reduction in the number of exchange reactions involving isophorone diisocyanate, and a reduction in the chemical bond richness of the IEPM.

The disparity between mechanical energy transferability in x-IEPM-$t_c$ for different values of $t_c$ is larger under dynamic loading than under static conditions. The width and quality of the IEPM region that lies between pure polyurea and pure epoxy, between $I_{Ex}$ and $I_{Pu}$ in FIG. 1C, decrease as tc increases. The decrease of width and quality of the IEPM material also elicits a decrease in bulk mechanical energy transferability in x-IEPM-$t_c$, for example x=C. In one embodiment, the IDA/IEPM material and processing technologies may include fast-curing pre-polymerized polyurea and slow-curing epoxy that tune the diffusion processes of the migrating epoxy species to produce IEPM after modifying the epoxy surfaces. This process dials-in bulk mechanical energy transferability to produce the IEPM material, while providing the x-IEPM-$t_c$ composite system and the structure that x-IEPM-$t_c$ reinforces or strengthens with tremendous loss modulus (and material damping), fracture toughness, and impact resistance.

This allows x-IEPM-$t_c$-designed structures to resist tornado-induced debris-impacts, automotive crashes, and ballistic-impacts. Further, seismic forces experienced by buildings are minimized as large accelerations and inter-story drifts are reduced, and the likelihood of unseating of the bridge superstructures is drastically minimized. Further, large surge and lateral wave forces experienced by coastal bridges during intense hurricane events is drastically minimized. Further, the examination of the fracture surfaces of x-IEPM-$t_c$ coupon-scale specimens, for example where x=C, via a scanning electron microscope (SEM) reveal a unique self-adjusting micro-failure characteristic. In one embodiment, the IDA modification provides necessary load transferring paths to the damage-tolerant composite. Further, the redistribution of forces in x-IEPM-$t_c$, via the IEPM, controls its stress-strain behaviour to sustain its high strength and enhance its energy absorption capability, or resiliency—and its overall structural integrity—at lower $t_c$ by desirably relegating accumulated subcritical microstructural damage to non-connected local damage events, rather than not preventing single damage events that, at large $t_c$ or with no IEPM, would bridge together to cause catastrophic failure of the composite or the reinforced or strengthened structure. The analysis of the sample 0-IEPM-$t_c$=0.5 composite (0=no fiber) reveals its stress intensity factor, $K_{IC}$, is 3.6 MPa m$^{1/2}$, is 211% of previous epoxy-toughening findings. Larger $K_{IC}$ means greater fracture toughness.

The Role of Polyoxypropylene Diamine

Polyoxypropylene diamine may react with the epoxide functional groups from epoxy. At $t_c$=0 and using polyoxypropylene diamine instead of polyol to produce the urea molecule that that is used in the IDA reaction, the number of moisture-trapping urethane (—NH—C(O)—O—) bonds may be minimized, thus introducing substantial resiliency to and sustaining the composite strength of x-IEPM-$t_c$, including high-strength carbon-fiber (x=C). In field applications where polyurea is topically sprayed on curing epoxy, then depending on the pressure and temperature of an (—NCO) and (—NH$_2$)-polyurea mixture, the pre-polymerization of polyurea (prepolymer) via polyoxypropylene diamine produces urea bonds that gel in seconds via the thermodynamic exchange reaction with (—NH$_2$)-epoxy in FIG. 3B as a function of $t_c$, where (—NH$_2$)-epoxy partially supplants (—NH$_2$)-polyurea. In one embodiment, a stoichiometric balance exists between isophorone diisocyanate and polyoxypropylene diamine. In another embodiment, a stoichiometric balance exists between any other molecule that includes an (—NCO) functional group and polyol.

In one embodiment, polyoxypropylene diamine fully reacts with isophorone diisocyanate quasi pre-polymer. Other investigations include curing the epoxy polymer with polyoxypropylene diamine. The polyoxypropylene diamine includes physiomechanical and adhesion properties. Further, there is no reaction between the (—NCO) moieties of a urea molecule, which may be composed of (—NCO) functional groups and fully reacted polyoxypropylene diamine in FIG. 3A, and epoxide because of a stochiometric balance between isophorone diisocyanate and polyoxypropylene diamine. Further, the lack of polyoxypropylene diamine to react with epoxide then forces (—NCO) of the urea molecule to react with Ni$_2$-epoxy (amine from epoxy). The stoichiometric balance ensures that polyoxypropylene diamine (or polyol as another example) does not react with epoxide functional groups of the curing or pre-curing ($t_c$=0) epoxy.

The polyoxypropylene diamine which may compose the urea molecule introduces critical N—H bending modes into IEPM constructions. Even at lower $t_c$ and even at $t_c$=0, without the presence of copious critical N—H bending modes introduced by polyoxypropylene diamine—its presence verified by chemical mapping of its wavenumber (1550 cm$^{-1}$)—the chemical bond richness of the IEPM diminishes and lacks the necessary chemical bonding to elicit sufficient critical fracture toughness and loss modulus (damping) properties of x-IEPM-$t_c$ composite and structures reinforced and strengthened by x-IEPM-$t_c$.

In one embodiment, the polyoxypropylene diamine introduces critical N—H chemical bonds to the IEPM via IDA modification. The concentration and distribution, i.e., the chemical bond richness, of N—H bonds elicits uniquely designed IEPM composite constructions. If urea bonds are formed via reaction of isophorone diisocyanate or diphenylmethane diisocyanate quasi-prepolymer or hybrid polyurea or any other molecule that includes an —NCO functional group, and polyol, then an undesirable reaction occurs that traps moisture. The reaction with polyol diminishes the molecular vibrational properties of the IEPM following epoxy surface modification, and diminishes properties of the x-IEPM-$t_c$ composite, including ballistic-resistant panels, and diminishes properties of a structure that has been reinforced or strengthened by x-IEPM-$t_c$, including tornado-resistant panels in wood-frame construction and the concrete girder-to-cap-beam connections in concrete coastal bridges.

In one embodiment, the reaction between isophorone diisocyanate or any other molecule that includes an —NCO functional group and polyoxypropylene diamine forms unique urea chemical bond constructions that include isocyanate (—NCO) functional groups that react with amine functional groups from pre-curing or curing epoxy. The urea bond molecule is generated in accordance with a stoichiometric balance of polyoxypropylene diamine upon its reaction with isophorone diisocyanate quasi-prepolymer so that the former does not react with epoxide functional groups of the curing or pre-curing epoxy.

Figure 4:
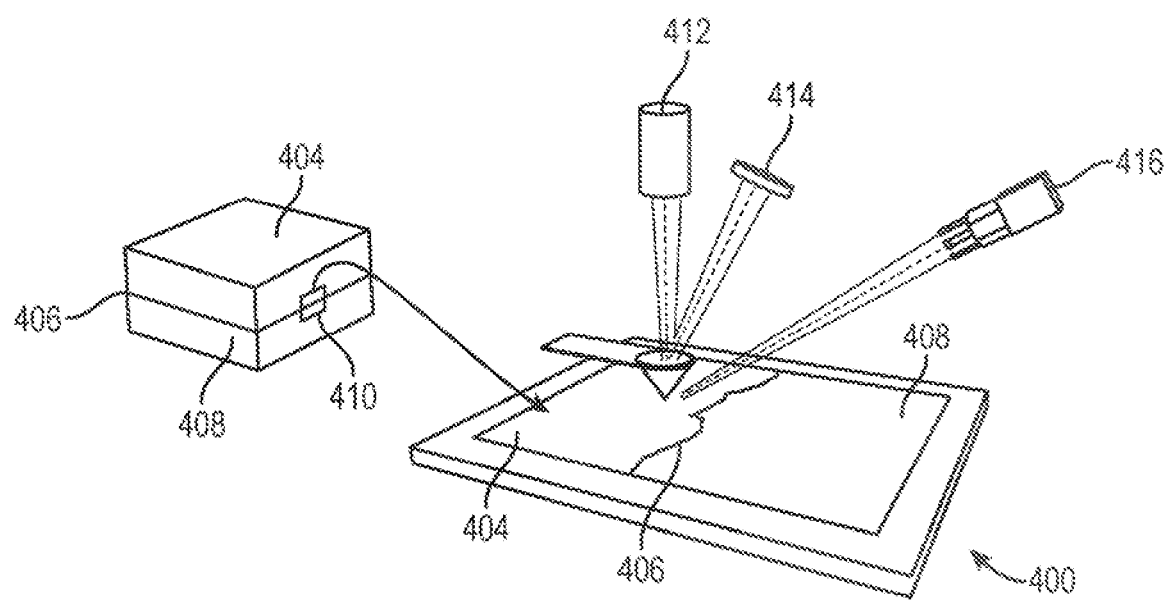
FIG. 4 exemplarily illustrates an optimal image of a microtomed sample of IEPM, according to an embodiment of the present invention.

Referring to FIG. 4, optical image 400 of a microtomed sample (1 mm×1 mm×200 nm), from which chemical images (AFM) and wavenumber compositions were ascertained using a nano-IR2 instrument. The chemical images (AFM) and wavenumber compositions were ascertained using cantilever deflection 412, laser beam 414, and pulsed tunable IR source 416. Optical image 400 is a microtomed section 410 of IEPM 406 bounded by the pure polyurea layer 404 and pure epoxy layer 408.

Chemical Bonding of IEPM Material

In one embodiment, the reaction between isocynate functional groups of a urea molecule and amine groups (constituting an epoxy-hardener) occurs quickly with a high reaction rate/gel-time of 10 seconds (approximating the fast-reaction rate of pure polyurea). The result is a three-part reaction involving functional groups epoxide, amine epoxy hardener and isocyanate. The subsequent formation is a new amine-urea bond (IEPM material) between epoxy and polyurea moieties. Six validations including (a) nano-IR spectra; (b) chemical wavenumber mapping and AFM; (c) non-negative matrix factorization (NMF); (d) size of the laser tip used by the Nano-IR2 instrument; (e) thermomechanical analysis (TMA); and (f) dynamic mechanical analysis (DMA) and nanoindentation confirm the presence of chemical bonding in the IEPM material and is discussed in detail in the following sections.

Nano-IR Spectra

Referring to FIG. 4, changes in dipole moments (energy fluctuations per absorbed IR radiation) across several IEPM regions are identified using a nano-infrared instrument (Nano-IR2), and Fourier-transform infrared spectroscopy (FTIR). AFM-FTIR and nanoindentation results were analyzed at nano- and micro-scales, revealing that the diffusivity of migrating epoxy species, in accordance with $t_c$, discerns unique distributions of characteristic peaks (wavenumbers) and bond-molecule structures (and cohesion and molecular vibrational properties) across the IDA-modified epoxy surface, linking nanoscale changes to the engendered IEPM material to bulk-scale behavior of x-IEPM-$t_c$ and structures reinforced or strengthened by x-IEPM-$t_c$.

Referring to FIGS. 5A to 5M, the reaction kinetics of (—NCO), epoxide, and (—$NH_2$)-amine epoxy (hardener) ascertains a library of IEPM chemical compositions. The chemical compositions of the IEPM were characterized by IR spectra. Further, to understand the effect of tc on IEPM bond strength and quality, which affect bulk properties, patterns of chemical bonding and physical mixing were examined in 0-IEPM-$t_c$ samples, where "0" means that no fiber was used in the construction of the sample). The samples were sliced to a thickness of less than 200 nm.

Figures 5A, 5B, 5C:
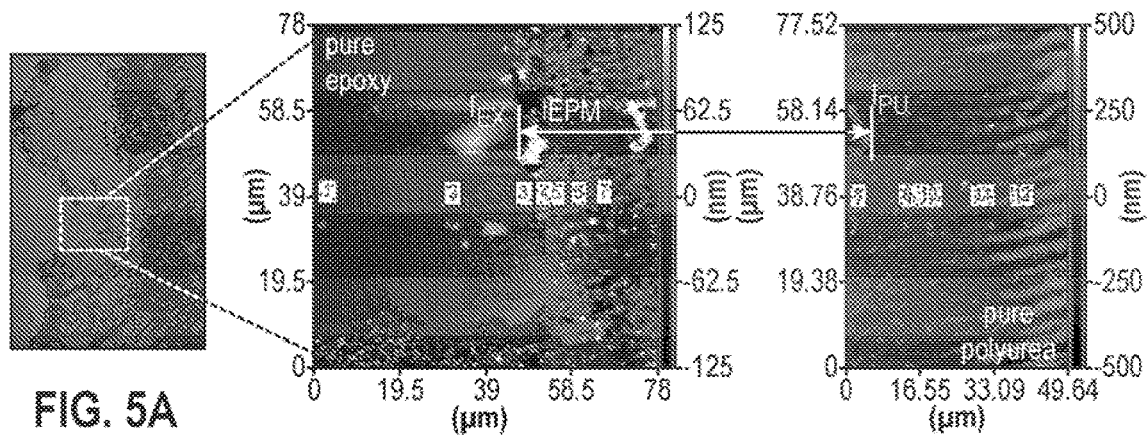
FIGS. 5A to 5M exemplarily illustrate an optical microscopic image, atomic force microscopy (AFM) image, and infrared (IR) spectra of various types of IEPM, according to an embodiment of the present invention.

FIG. 5A illustrates the IEPM region of a 0-IEPM-$t_c$=0 sample taken via optical microscopy. FIGS. 5B and 5C, depict the IEPM material, or more specifically IEPM-$t_c$=0, as being located between the pure epoxy and the pure polyurea. The IDA surface modification of pre-curing ($t_c$=0) or curing/wet (0.5≤$t_c$≤1-5) or tacky epoxy (1.5<$t_c$<24) epoxy produces the IEPM material. This may also be designated as IEPM-$t_c$ for specific $t_c$. In one embodiment, a three-part reaction involving functional groups (—NCO), epoxide, and (—$NH_2$)-epoxy (hardener), where the availability of the (—NCO) groups is specific to an isophorone diisocyanate quasi-prepolymer reaction with polyoxypropylene diamine to introduce high enthalpic urea bonds with copious carbonyl stretching and N—H bending modes, produces the IEPM (or IEPM-$t_c$) material. At lower $t_c$, the three-part reaction that elicits the IEPM construction, or composition, enhances the chemical bond richness, or prevalence, of molecular vibrational properties, which include carbonyl stretching and N—H bending modes. For IEPM material, "lower" $t_c$ or "smaller" $t_c$ is defined as $t_c$≤1.0.

Figure 5D:
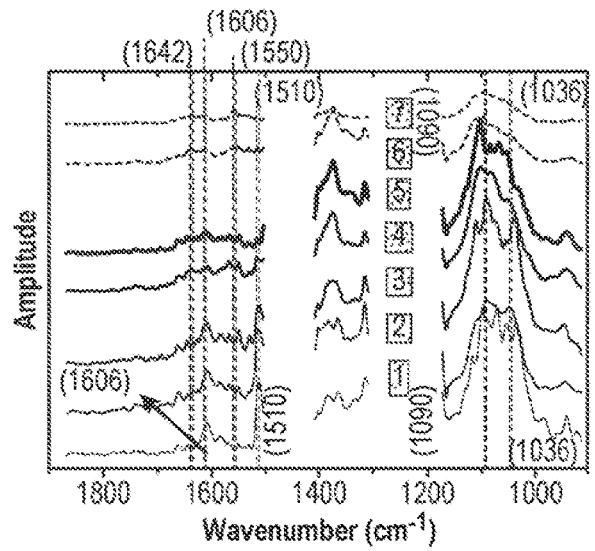

Referring to Table 1, IEPM composition with chemical bond richness containing both polyurea and epoxy has higher absorption peaks. The absorption peaks are 1510 $cm^{-1}$, 1606 $cm^{-1}$, 1550 $cm^{-1}$, and 1642 $cm^{-1}$. The lower frequency peaks (<1300 $cm^{-1}$) are typically not strong indicators of specific polymers. The absorption peaks at 1510 $cm^{-1}$ and 1606 $cm^{-1}$ refer to C—C and C=C bonds (stretch modes) of epoxy. The absorption peak at 1550 $cm^{-1}$ (polyurea) refers to the secondary amine with N—H (bending mode) and C—N(stretching mode). The absorption peak at 1642 $cm^{-1}$ (polyurea) represents a broad urea carbonyl absorption peak covering four bands between 1675 $cm^{-1}$ and 1590 cm [095] The value of $t_c$, which correlates to the number of reactions of epoxy species prior to the addition of the specific urea molecules, will affect the quality of the IEPM (or IEPM-$t_c$). The quality of the IEPM is defined relative to defects/voids, bond strength (in terms of bond enthalpy), and energy transferability. Referring to FIG. 5D, the bottom-to-top direction corresponds to the left (epoxy)-to-right (polyurea) sides in FIGS. 5B and 6C.

TABLE 1 further summarizes the bond enthalpies and the vibrational modes that relate to the molecular vibrational energies. The bottom spectrum of the epoxy region (points 1-3) reveals characteristic absorption peaks of pure epoxy that include C—O—C stretching of ethers (1036 $cm^{-1}$ and 1090 $cm^{-1}$ absorption peaks). The top spectrum of the polyurea region (points 9-12) shows characteristic peaks of pure polyurea, including the 1090 cm 1 absorption peak (C—O—C) which is also found in IEPM. Points 1-3 and 9-12 also contain higher frequencies (>1300 $cm^{-1}$). Points 4-8 represent good chemical bond richness, shown in FIG. 5B and FIG. 5C, because of the simultaneity of the four characteristic absorption peaks (1510 $cm^{-1}$, 1550 $cm^{-1}$, 160 6 $cm^{-1}$, and 1642 $cm^{-1}$) at single nano-scale points in the IEPM composition at $t_c$=0 (IEPM-$t_c$=0) that depends on thermodynamic processing as a function of $t_c$.

TABLE 1 shows the characteristic peaks located at twelve different points across the 0-IEPM-$t_c$=0 sample of FIGS. 5A to 5M.

| Location/points (material) | Characteristic Peaks in sample 0-IEPM-tc = 0 (IR results) |
|---|---|
| 1-3 (epoxy) | 1036 $cm^{-1}$, 1090 $cm^{-1}$, 1510 $cm^{-1}$, 1606 $cm^{-1}$ |
| 4-8 (IEPM) | 1036 $cm^{-1}$, 1090 $cm^{-1}$, 1510 $cm^{-1}$, 1550 $cm^{-1}$, 1606 $cm^{-1}$, 1642 $cm^{-1}$ |
| 9-12 (polyurea) | 1090 $cm^{-1}$, 1550 $cm^{-1}$, 1642 $cm^{-1}$ |

Chemical bonds identified according to their peaks
1510 $cm^{-1}$ & 1606 $cm^{-1}$: C—C stretching and C=C stretching of aromatic rings
1550 $cm^{-1}$: secondary amine with N—H bending and C—N stretching modes
1642 $cm^{-1}$: represents broad urea carbonyl stretching, covering 4 bands between 1675 $cm^{-1}$ and 1590 $cm^{-1}$
1090 $cm^{-1}$ & 1036 $cm^{-1}$: C—O—C stretching of ethers; also contained in polyurea
Bond enthalpy (kJ/mol)
C—C: 348; C=C: 614; N—H: 391; C—N: 308; C = 0: 745; C—O: 358;

When $t_c$ is smaller ($t_c$≤1.0), the IEPM composition is considered to be proper and of good quality, whereas at $t_c$=0, IEPM is of best or highest quality. The IEPM composition, or material, is chemically bonded between layers of epoxy, shown on the left side of FIG. 5B, which are cross-linked to x-F/E, and layers of polyurea coating, shown on the right side of FIG. 5C. A proper and high-quality IEPM construction, dramatically improves post-elastic absorption, loss modulus, and fracture toughness properties of conventional high-tenacity ("x") fiber composites, x-F/E. The results have been verified using atomic force microscopy and chemical wavenumber mapping, shown in FIGS. 6A to 6Y.

Figure 5E:
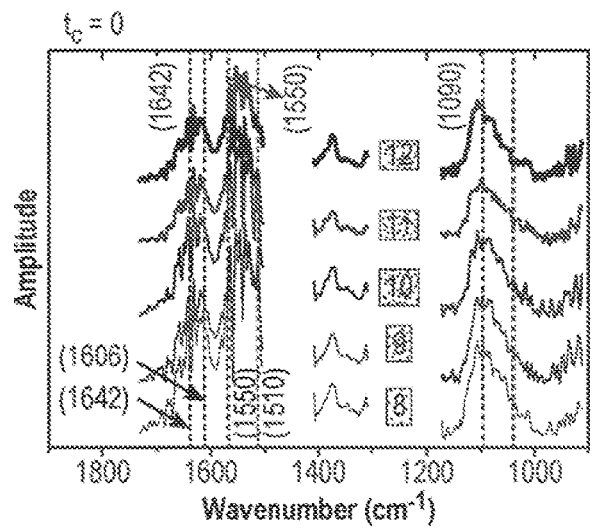
Figure 5F:
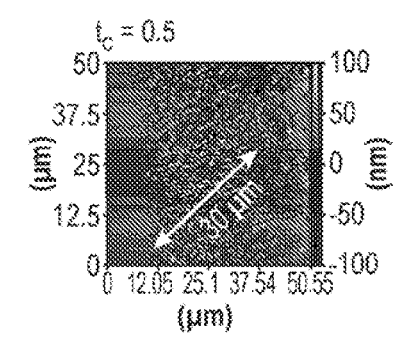
Figure 5G:
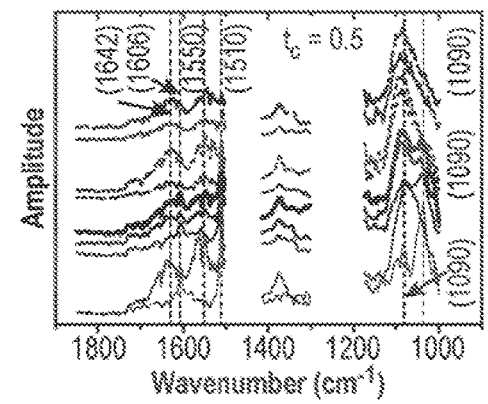
Figure 5H:
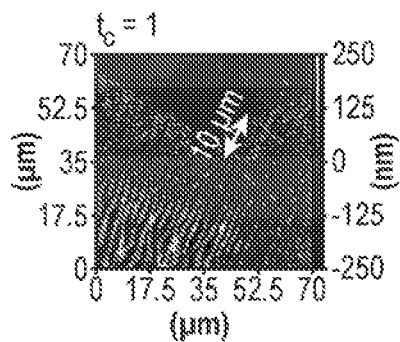
Figure 5I:
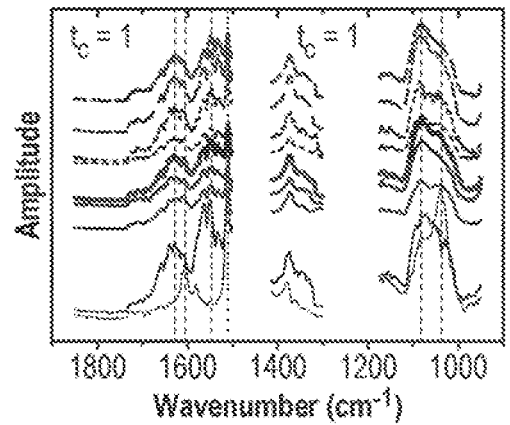
Figure 5J:
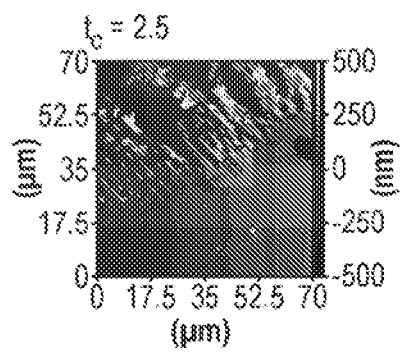
Figure 5K:
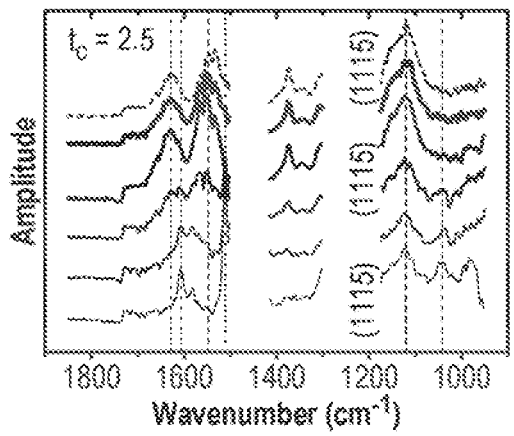
Figure 5L:
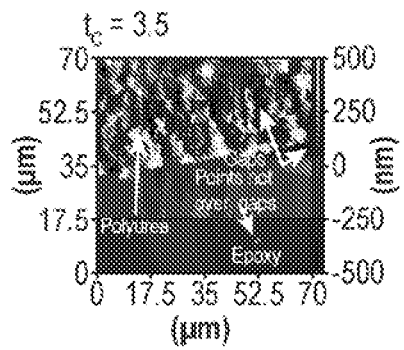
Figure 5M:
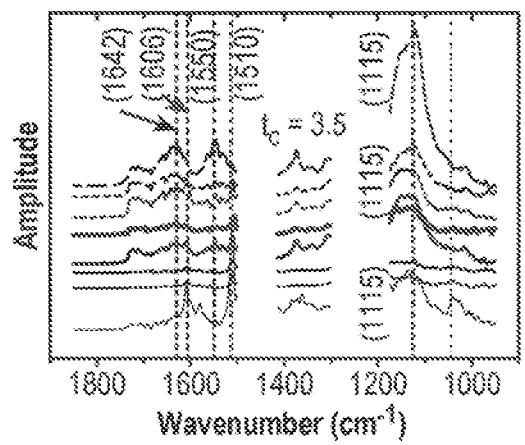

Referring to FIGS. 5D and 5E, at smaller $t_c$, for example at $t_c$=0 which specifies the pre-curing stage of epoxy, and upon IDA epoxy surface modification, the IR spectra corresponding to N—H bending modes (wavenumber 1550 $cm^{-1}$) are observed across a properly constructed IEPM. The IEPM regions in 0-IEPM-$t_c$=0 in FIGS. 5D and 5E, 0-IEPM-$t_c$=0.5 in FIG. 5G, and 0-IEPM-$t_c$=1.0 in FIG. 5I have unique IR spectra features. Referring to FIGS. 5H and 5I, AFM and IR spectra across sample 0-IEPM-tc=1.0 where the IEPM-$t_c$=1.0 region is 10 μm wide. Referring to FIGS. 5J and 5K, AFM and IR spectra across sample 0-IEPM-$t_c$=2.5 where the IEPM-$t_c$=2.5 region is less than 2 μm wide. Referring to FIGS. 5L and 5M, AFM and IR spectra across sample 0-IEPM-$t_c$=3.5 where the IEPM-$t_c$=3.5 region is also less than 2 μm wide. The IR spectra evolve with the gradual decrease in the relative amplitudes of the epoxy characteristic absorption peaks (1036 $cm^{-1}$, 1510 $cm^{-1}$, 1606 $cm^{-1}$) and a gradual increase in the relative amplitudes of the polyurea characteristic absorption peaks (1550 $cm^{-1}$, 1642 $cm^{-1}$).

This includes simultaneity of polyurea absorption peaks (1550 $cm^{-1}$, 1642 $cm^{-1}$) and epoxy absorption peaks (1510 $cm^{-1}$, 1606 $cm^{-1}$). Different distribution characteristics across various IEPM-$t_c$ material compositions/constructions, including the prevalence of simultaneity of the four peaks at singe nanoscale points, the presence of physical mixtures, the presence of chemical bonds, and the width of the IEPM $t_c$ material as a function of $t_c$, indicate different degrees of chemical bond richness, i.e., the copiousness of the chemical bonds identified by absorption peaks 1510 $cm^{-1}$, 1550 $cm^{-1}$, 1642 $cm^{-1}$, and 1606 $cm^{-1}$, that define and compose the IEPM material, where richness is inversely proportional to $t_c$ and decreases as $t_c$ increases. As $t_c$ increases ($t_c>0$), the presence of the N—H bending and C—N stretching modes (1550 cm$^1$) decreases relative to the N-0 stretching mode (1540 cm$^{-1}$ peak). Further, the loss modulus decreases as $t_c$ increases. There is a distinctive decrease in the presence of N—H bending modes in IEPM-$t_c \geq 1.0$.

The sample 0-IEPM-$t_c=2.5$ in FIG. 5J displays a distinct boundary between epoxy and polyurea with negligible transitionality between epoxy and polyurea. A significant number of physical gaps is also observed along the boundary of sample 0-IEPM-$t_c=2.5$ which is a characteristic of x-IEPM-$t_c$ constructions designed with larger $t_c$, wherein large or larger $t_c$ means $t_c \geq 1.0$. A significant number of gaps between the IEPM and epoxy or the IEPM and polyurea or in the IEPM along with a narrow IEPM width ($\leq 2$ µm) are characteristics of low-quality, or poor-quality, IEPM compositions, where 0-IEPM-$t_c=2.5$ is a poor-quality construction. Bulk energy transferability properties in IEPM constructions that are of poor quality are less, including loss modulus and fracture toughness, compared to IEPM that are of good quality, such as IEPM-$t_c<1.0$.

The sample 0-IEPM-$t_c=24$ completely separated during the microtome cutting process. This is a result of a weak reaction between polyurea and epoxy when polyurea was sprayed to fully cured epoxy (after the epoxy had cured for 24 hours after being initially mixed). The sample 0-IEPM-$t_c=24$ is composed of physical mixtures, i.e., no chemical bonding between epoxy and polyurea.

Chemical Wavenumber Mapping and AFM

Figures 6A, 6B, 6C:
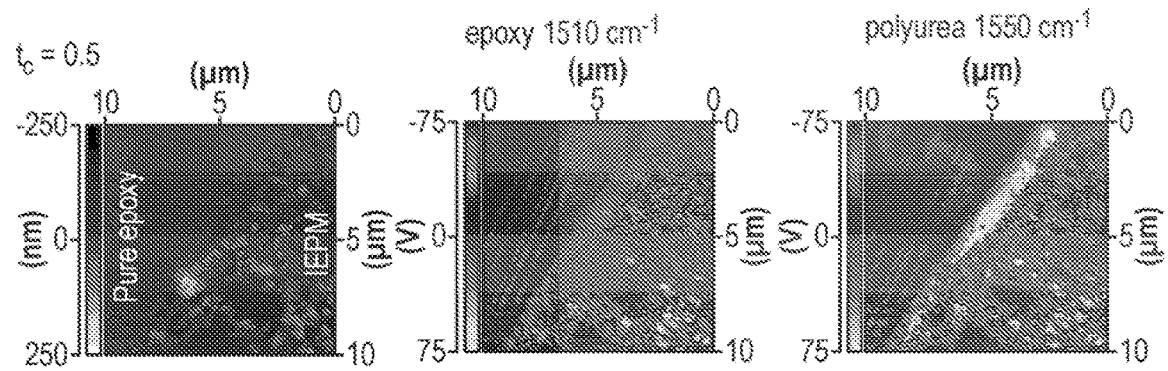
FIGS. 6A to 6Y exemplarily illustrate AFM images and chemical images of various types of IEPM, according to an embodiment of the present invention.
Figures 6D, 6E, 6F:
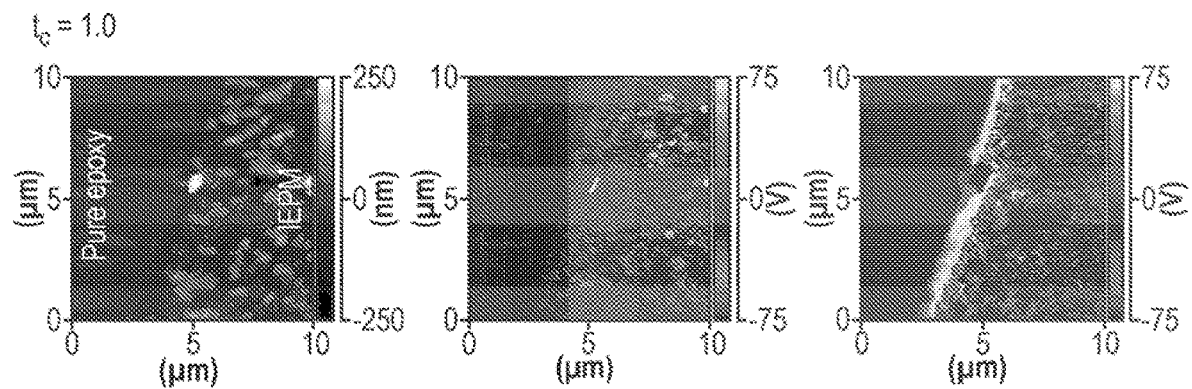
Figures 6G, 6H, 6I:
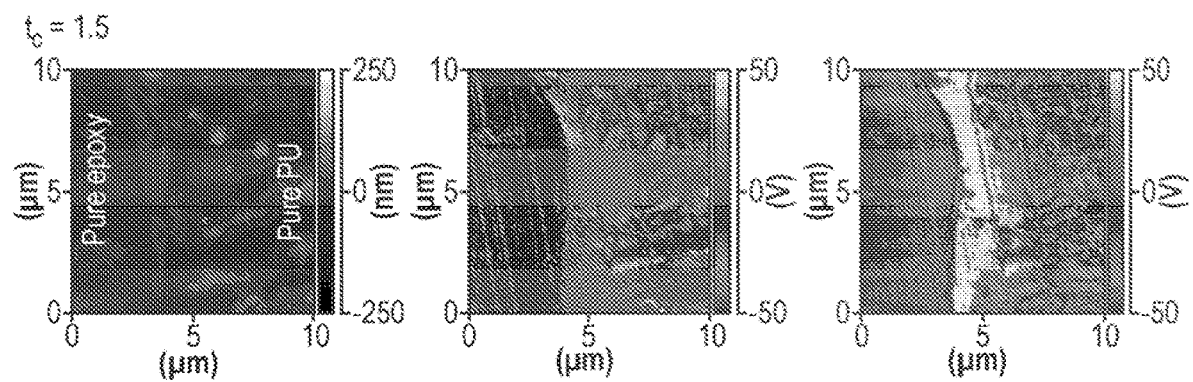
Figures 6J, 6K, 6L:
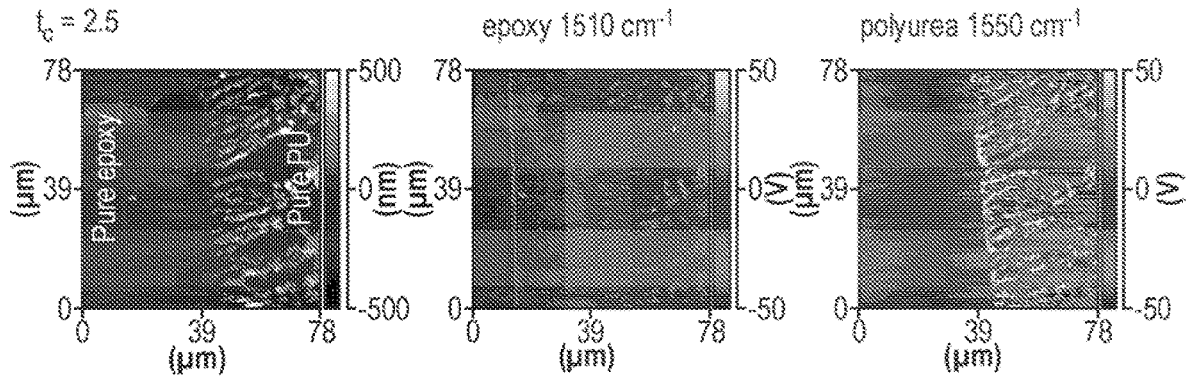
Figures 6M, 6N, 6O:
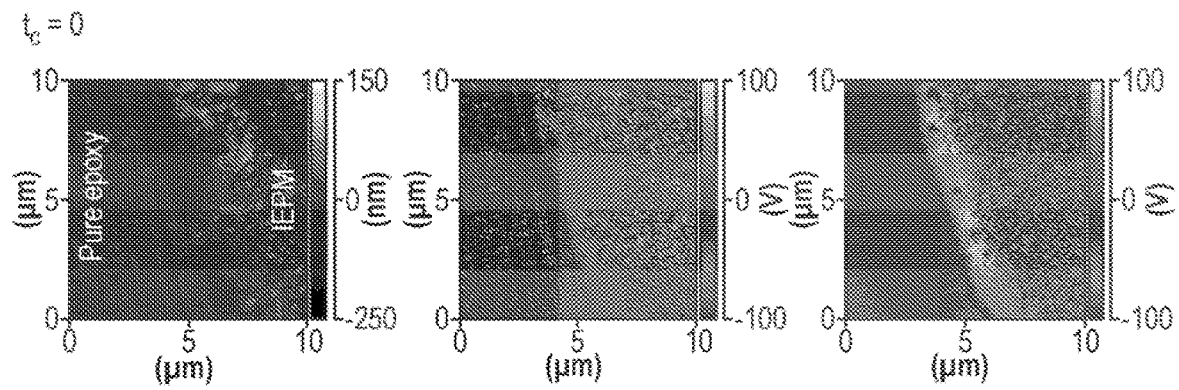
Figures 6P, 6Q, 6R:
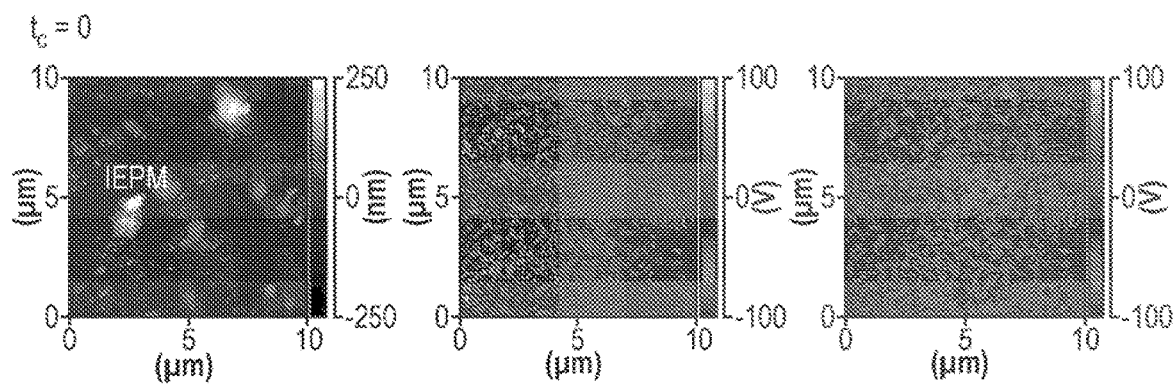
Figure 6S:
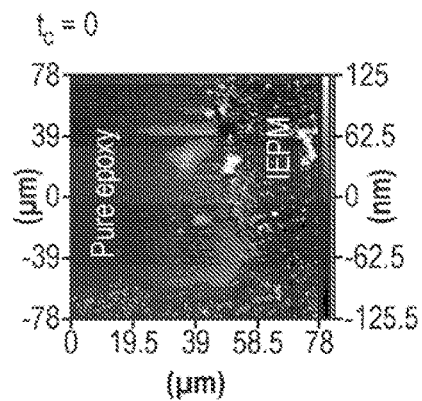
Figures 6T, 6U, 6V:
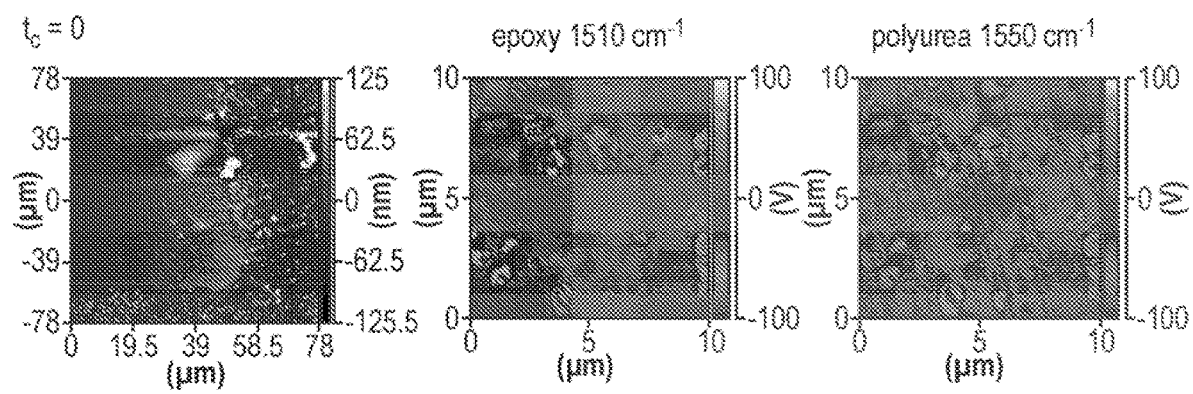
Figures 6W, 6X, 6Y:
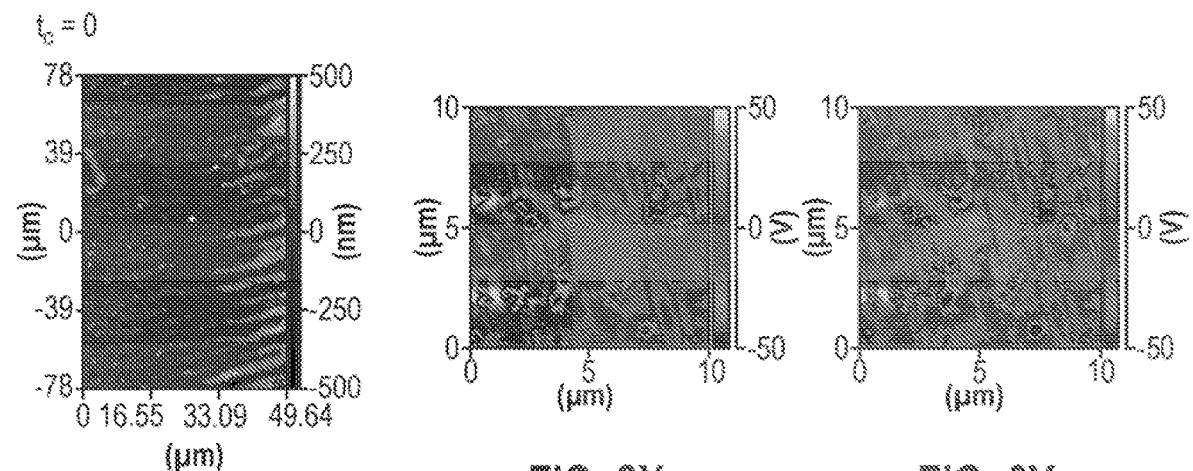

Referring to FIGS. 6A to 6Y, the chemical maps obtained using the same Nano-IR2 instrument, further exemplify chemical bond richness, elucidating a very high improbability that multiple, single nanoscale points, each of size 80 nm, could consistently reveal both polyurea (1550 cm$^{-1}$) and epoxy (1510 cm$^{-1}$) as part of a physical mixture. The results are verified by wavenumber mapping of 1550 cm$^{-1}$ across the IEPM-tc materials and corresponding to the secondary amine with N—H bending and C—N stretching modes of polyurea throughout the IEPM material in FIGS. 6O, 6R, 6V, 6Y, 6C, 6E, 6I, and 6L. FIGS. 6N, 6Q, 6U, 6X, 6B, 6E, 6H, and 6K confirm the simultaneity of epoxy (1510 cm$^{-1}$ wavenumber corresponding to C—C stretching and C═C stretching of aromatic rings) and polyurea at the same locations.

Simultaneity corresponds to IEPM-tc compositions constructed at tc=0, 0.5, and 1.0. Simultaneity is stronger in IEPM-$t_c=0$ and IEPM-$t_c=0.5$. Further, in FIGS. 6E and 6F, the prevalence of simultaneity of epoxy and polyurea peaks begins to diminish in the IEPM-$t_c$ material engendered at $t_c=1.0$. In FIGS. 6M, 6N, 6O, 6P, 6Q, 6R, 6S, 6T, 6U, and 6V, epoxy and polyurea simultaneity is consistent across the width of the IEPM that has been conceived at $t_c=0$. In FIGS. 6W, 6X and 6Y, the presence of epoxy (1510 cm$^{-1}$) remains strong in the IEPM region even near to the polyurea side. The AFM and chemical images reveal discrepancies between 0-IEPM-$t_c=0$ and 0-IEPM-$t_c=2.5$. Further, FIGS. 6M to 6Y shows chemical maps of 0-IEPM-$t_c=0$ at various locations as indicated by the AFM images, starting at the epoxy-IEPM border in FIGS. 6M and 6S.

A comparison of IEPM-$t_c=0$ and IEPM-$t_c=0.5$ shows that the grain size across the IEPM-$t_c=0$ material is smaller (and discernable) than the grain size across the IEPM-$t_c=0.5$ material. The degree of spread of the simultaneity of polyurea and epoxy peaks, i.e., "chemical bond richness, IEPM-$t_c=0$. There is also strong simultaneity of polyurea and epoxy peaks across IEPM-$t_c=0.5$, shown in FIGS. 5F, 5G and 6A. Simultaneity and distinction of grains begin to decrease across IEPM-$t_c>1$, e.g., IEPM-$t_c=2.5$, as there is also insufficient simultaneity, shown in FIGS. 5J, 5K and 6J. The consistently small and discernable grain sizes across IEPM-$t_c=0$ and the simultaneity of polyurea and epoxy peaks validate a rich distribution of chemical bonds formed by a reaction of epoxy and polyurea moieties, evident at single nanoscale points and consistently spanning the relatively wide IEPM-$t_c=0$ region (50 µm).

The lower-viscosity epoxy-resin (v=534 cps) produces more distinct epoxy grains across IEPM-$t_c \leq 0.5$ than medium-viscosity epoxy-resin (v=1,367 cps). Therefore, large-viscosity epoxy-resin was not examined in detail. 0-IEPM-$t_c=0.5$ in FIG. 6A, depicts large distinct epoxy grains ("large pebbles") adjacent to bulky epoxy and a gradual change in grain size in the IEPM starting near to the neat epoxy side. The chemical bonding is evidenced in FIGS. 6B and 6C for IEPM-$t_c=0.5$ and FIGS. 6N, 6O, 6Q, 6R, 6U, 6V, 6X, and 6Y for IEPM-$t_c=0$. Chemical mapping of epoxy (1510 cm$^{-1}$) and polyurea (1550 cm$^{-1}$) wavenumbers reveals the presence of both epoxy and polyurea. Since epoxy and polyurea are present at the same nanoscale location (80 nm), the presence of chemical bonding can be predicted. Sample 0-IEPM-$t_c=0.5$ shows a polyurea-rich region in FIG. 6C at the boundary between the IEPM and pure epoxy which is also an epoxy-rich region in FIG. 6B, demonstrating the presence of strong chemical bonding across the IEPM material and demonstrating large penetration (<50 µm) of polyurea moieties beyond the surface of the curing epoxy at low tc, resulting in the IDA modification. Samples 0-IEPM-$t_c=1.0$ and 1.5 depict less distinctive grains across their IEPMs which indicates decreasing simultaneity of epoxy and polyurea (chemical bonding) and an increase in physical mixtures. This is attributed to a decrease in diffusivity of the migrating epoxy species as $t_c$ increases.

Referring to FIGS. 6E and 6F, IEPM-$t_c=1.0$, indicates chemical bonding and simultaneity of epoxy and polyurea peaks. In sample 0-IEPM-$t_c=2.5$, FIG. 6K shows a narrow IEPM region and a weak presence of chemical bonding. This also indicates that the shear strength of x-IEPM-$t_c$ decreases at $t_c \geq 2.5$ (during the microtome cutting process).

Non-Negative Matrix Factorization (NMF)

The non-negative matrix factorization (NMF) is used for analysis and confirmation of IEPM compositions that have been produced using smaller values of $t_c$ to identify IEPM characteristics using statistics to verify the presence of chemical bonding. The NMF constitutes state-of-the-art in identifying characteristics of materials using statistics. In the NMF modeling/analysis and in order to perform nano-IR spectral analyses, it was reasonable to draw a line of 100 points that spanned from the pure-epoxy region across the IEPM material to the pure polyurea region for all x-IEPM-$t_c$ samples that were analyzed.

The nano-IR spectra of all points per each x-IEPM-$t_c$ sample were rearranged to form a nano-IR spectra matrix V. The NMF was used to de-convolute the spectra using matrix W (wavenumber spectra) and intensity matrix H by V=W*H. By definition of NMF, the three matrices V, W, and H have no negative elements. Each vector in W is a de-convoluted vector of a single IR spectrum along the line of nano-IR scanning points. The original non-normalized IR data was de-convoluted, i.e., statistically decompiled, into 6 Vectors. The combination of the 6 vectors would result in the original "convoluted" spectra. The six vectors provide sufficient statistical insight into the chemical bonding as a function of $t_c$.

Figure 7A:
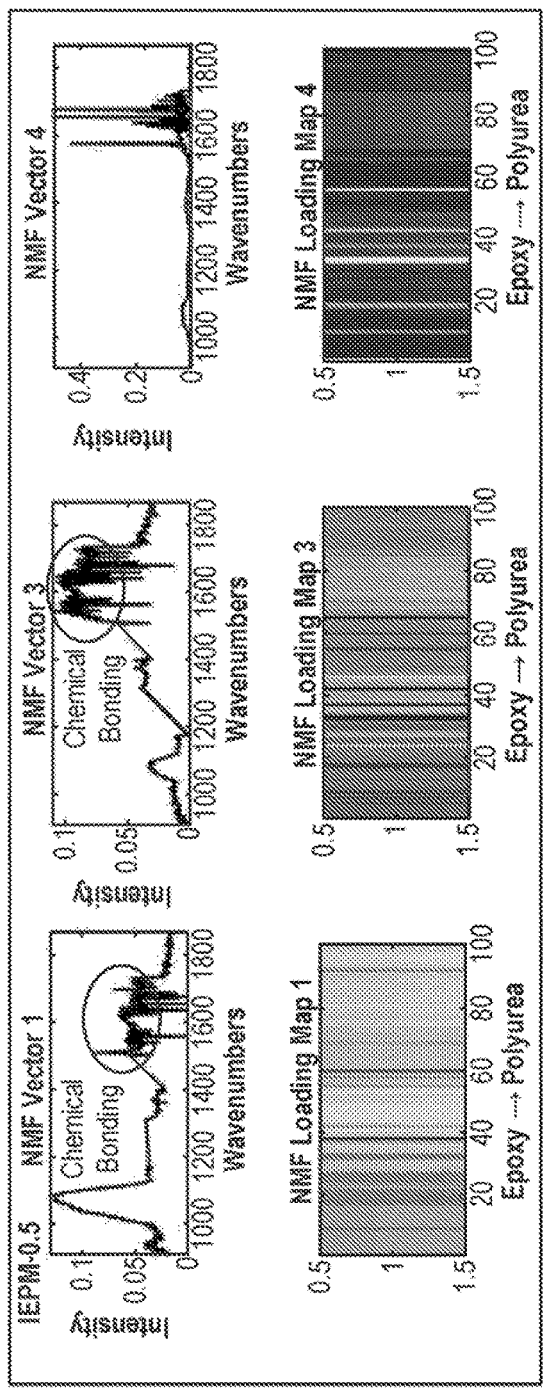
FIG. 7A exemplarily illustrates NMF vectors and corresponding intensity loading maps of sample 0-IEPM-0.5, according to an embodiment of the present invention.
Figure 7B:
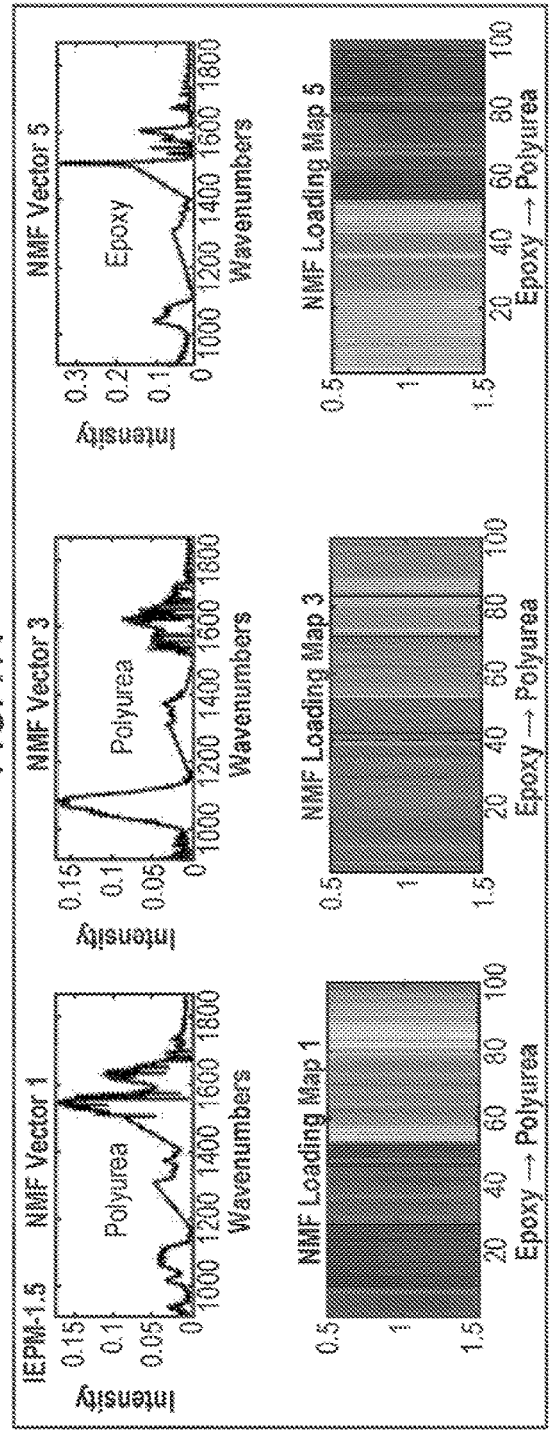
FIG. 7B exemplarily illustrates NMF vectors and corresponding intensity loading maps of sample 0-IEPM-1.5, according to an embodiment of the present invention.
Figure 7C:
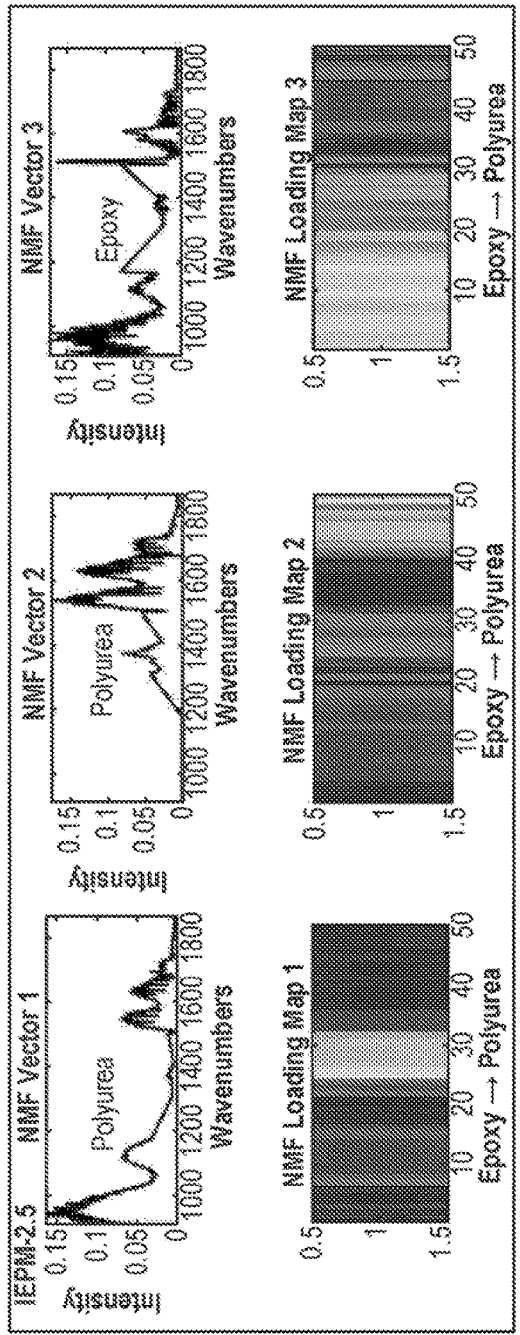
FIG. 7C exemplarily illustrates NMF vectors and corresponding intensity loading maps of sample 0-IEPM-2.5, according to an embodiment of the present invention.
Figure 7D:
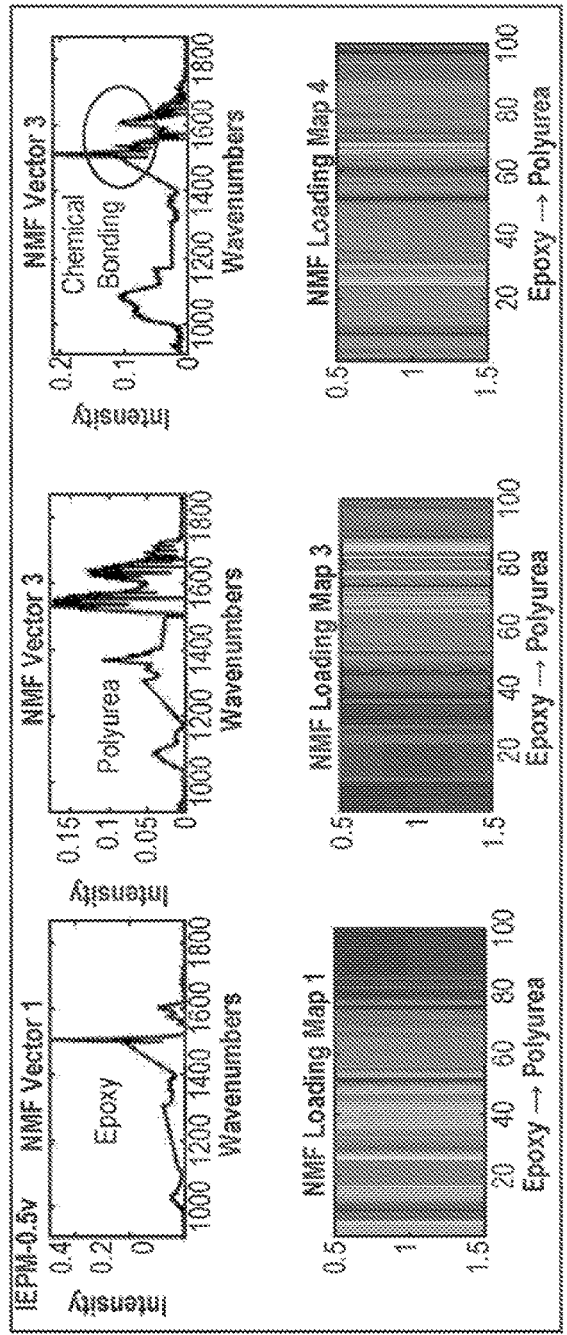
FIG. 7D exemplarily illustrates NMF vectors and corresponding intensity loading maps of sample 0-IEPM-0.5v, according to an embodiment of the present invention.

FIGS. 7A to 7D are samples of four representative de-convoluted vector spectra and the corresponding vector intensity loading maps. Referring to FIG. 1K, the spectra and maps correspond to 100 points analyzed across IEPM-$t_c$=0.5 in FIG. 5F with IR spectra in FIG. 5G. Referring to FIG. 7B, the spectra and maps correspond to 100 points analyzed across IEPM-tc=1.5. Referring to FIG. 1C, the spectra and maps correspond to 100 points analyzed across IEPM-$t_c$=2.5 in FIG. 5J with spectra shown in FIG. 5K. Referring to FIG. 7D, the spectra and maps correspond to 100 points analyzed across 0-IEPM-$t_c$=0.5v, where v indicates a medium epoxy resin viscosity v=1,367 cps, and a low epoxy resin viscosity v=534 cps. The significant chemical bond feature is indicated by the circled regions containing peaks 1510 cm$^{-1}$, 1550 cm$^{-1}$, 160 6 cm$^{-1}$, and 1642 cm$^{-1}$. Further, the significant chemical bond feature indicates the presence of both polyurea and epoxy at the same nanoscale locations.

Referring to FIG. 1K, the corresponding loading indicator map 1 and map 3 of sample 0-IEPM-$t_c$=0.5 indicate high intensity and widespread distribution of the four wavenumber peaks (1510 cm$^{-1}$, 1550 cm$^{-1}$, 1606 cm$^{-1}$, and 1642 cm$^{-1}$) across a significant portion of the IEPM, signifying a rich composition of chemical bonds. The NMF of sample 0-IEPM-$t_c$=0.5 in FIG. 7B reveals chemical bonding. The NMF of sample 0-IEPM-$t_c$=1-5 in FIG. 7B obtains only an epoxy vector (vector 5) and two polyurea vectors (vectors 1 and 3). No de-convoluted vectors that include both polyurea and epoxy peaks are observed.

Referring to FIG. 7C, the NMF of sample 0-IEPM-$t_c$=2.5 obtains only an epoxy vector (vector 3) and two polyurea vectors (vectors 1 and 2). No de-convoluted Vectors that include both polyurea and epoxy peaks are observed. A clear boundary exists between epoxy and polyurea at points 20-25. The clear boundary explains that the NMF analysis does not obtain a chemical bond indicator in IEPM-$t_c$=2.5 because no significant IEPM characteristics (simultaneity of polyurea and epoxy molecules) exist within the IR spectra in FIG. 5K.

Referring to FIG. 7D, the NMF of sample 0-IEPM-$t_c$=0.5v obtains clear patterns of epoxy (Vector 1) and polyurea (Vector 3). Loading maps of Vectors 1 and 3 confirm locations of epoxy and polyurea via their intensity distribution, but they do not indicate strong (rich) chemical bonding. Vector 4 of sample 0-IEPM-$t_c$=0.5v shows a combination of epoxy and polyurea peaks attributed to chemical bonding, but with a stronger epoxy feature than in 0-IEPM-$t_c$=0.5. This is attributed to the slower diffusivity of migrating epoxy species associated with the higher-viscosity epoxy. As a result, the IEPM region is narrower and contains less reactivity between isocyanate and amine (epoxy hardener) moieties.

The use of larger epoxy-resin viscosity v in the IDA surface modification will reduce chemical bond richness in the IEPM. This diminishes the molecular vibrational properties (Table 1) and bond strength of the IEPM. This also reduces the quality of the IEPM construction. At lower $t_c$, especially at $t_c$=0, IDA modification produces good quality and wide IEPM constructions that are characterized with a beach pebble topography. The beach pebble topography of the IEPM-$t_c$=0 material indicates distinctive grains in the IEPM and a gradual transitionality between pure epoxy and pure polyurea. Further, the gradual transitionality enhances the bond strength between IEPM and epoxy and between IEPM and polyurea. The sample 0-IEPM-$t_c$=0 contains strong chemical bond features and minimal physical mixtures in the exterior locations of its IEPM. At lower $t_c$ and especially at $t_c$=0, IEPM-tc=0 elicits the richest distribution of chemical bonds.

Size of the Laser Tip

The mix rate of the reaction between isocyanate and (NH$_2$)-epoxy (hardener) is high and gels within 10 seconds at room temperature. In very good quality x-IEPM-$t_c$ material compositions/constructions, where 0-IEPM-$t_c$=0 or 0-IEPM-$t_c$=0.5, characteristic wavenumbers 1510 cm$^{-1}$, 1550 cm$^{-1}$, 1606 cm$^{-1}$, and 1642 cm$^{-1}$ of both epoxy and polyurea molecules (where each is ≥100 nm length-scale) are consistently found in the IR spectra of the IEPM at single nanoscale points where the laser of the nano-IR2 instrument is only 80 nm. The simultaneity of the four major absorption peaks in 0-IEPM-$t_c$ with larger $t_c$ is not observed. IR spectra of sample 0-IEPM-$t_c$=3.5 appear weak in polyurea/epoxy simultaneity.

The simultaneity characteristic of epoxy and polyurea bonds is determined at various single-point nanoscale regions. The size of the laser tip of the Nano-IR2 instrument that was used in FIGS. 5 to 7 is 80 nm, which is less than the length of an epoxy molecule or a polyurea molecule.

Thermomechanical Analysis (TMA)

The thermomechanical analysis (TMA) composes a method for identifying the glass transition temperature, $T_g$, in materials by showing the relationship between the percentage of dimensional change $\Delta D$) of a heated material as a function of the applied temperature (T). The TMA Q400 instrument is a state-of-the-art instrument that is commonly used in the industry to perform thermomechanical analysis. The materials include polyurea, epoxy, and IEPM-$t_c$. The glass transition properties and IEPM re-generativity properties ("molecular resilience") depend on $t_c$, epoxy-resin viscosity (v), and polyurea type (PU) because of the moieties that are introduced. In one embodiment, the polyurea type may be an aliphatic, aromatic, hybrid polyurea. If the polyurea type is hybrid polyurea, it means the use of a polyurea/polyurethane blend that utilizes an amine-terminated resin chain extender and polyether polyol soft-block. PU type contains characteristic urea molecules having unique functional groups, as shown in FIG. 3A. The aliphatic polyurea type introduces moieties that are specific to the urea molecule herein that is produced via the isophorone diisocyanate and polyoxypropylene diamine reaction that then reacts with the (NH$_2$)-epoxy (hardener) functional groups, i.e., IDA modification, that specifically leads to the IEPM material herein. At $t_c$=0 and using a low-viscosity epoxy resin (v), the best quality or highest quality IEPM material is produced.

The applied temperature changes in increments of 5° C. TMA reveals unique $T_g$ characteristics of x-IEPM-$t_c$ as a function of $t_c$, v, and PU after IDA modification. $T_{g,\ polyurea}$ is defined as the $T_g$ of polyurea, and $\Delta T_{g,\ IEPM-PU}$ as the change or gradient ($\Delta$) between $T_g$, IEPM and $T_{g,\ polyurea}$ By maintaining relatively small $\Delta T_{g,\ IEPM-PU}$ and small $T_{g,\ polyurea}$, by designing x-IEPM-$t_c$ using lower v and aliphatic PU moieties (isophorone diisocyanate reaction with polyoxypropylene diamine to produce urea molecules with (—NCO) functional groups), and by using smaller rather than larger $t_c$ to effectuate a sharp decrease in the slope of the $\Delta D$ versus T relationship (via TMA), then IEPM catalyzes quickly and evokes IEPM re-generativity, or 'molecular resiliency,' that maximizes the critical loss modulus property. Molecular resiliency is defined as the re-generation of IEPM. For IEPM-$t_c$<24 which represents full cure of epoxy, IEPM regenerates after T=$T_g$, where regeneration signifies chemical bonding and formation of the new IEPM material.

For IEPM-$t_c$=24, there is no chemical bonding between epoxy and polyurea, only physical mixtures. For IEPM- $t_c=24$, no regeneration occurs at $T=T_g$. IEPM-$t_c=24$ is not material if a material is defined by the formation of chemical bonding. The loss modulus in IEPM-$t_c=24$ is the same as the loss modulus for pure polyurea and for pure epoxy. During an increase in T during the TMA process, $T_g$ is determined at $T=T_g$ when the slope of the $\Delta$D-versus-T relationship changes. The change in slope may be positive or it may be negative. For 0-IEPM-$t_c$ specimens where $t_c \leq 3.5$, there occurs a re-reaction or regeneration of IEPM at its unique glass transition temperature, $T_g$, IEPM. The characteristics of the relationship between percent dimensional change ($\Delta$D) and temperature (T) at each $T_g$, IEPM bring to light a new concept of "molecular resiliency," or regeneration, of IEPM, linking IEPM re-generativity to material damping in x-IEPM-$t_c$ composites.

Table 2 shows $T_g$ of various of C-IEPM-$t_c$ constructions to confirm the presence of molecular resiliency in C-IEPM-$t_c$, or when the epoxy surface is modified via IDA. C-IEPM-$t_c$ samples were manufactured using aliphatic, aromatic, or hybrid polyurea moieties. To understand how $t_c$ affects re-generativity, for IEPM-$t_c$ compositions using a common epoxy-resin viscosity ($v$), then as $t_c$ increases, the width of the IEPM region decreases, the prevalence of physical mixtures increases, and presence of chemical bonds decreases, therefore reducing the quality of IEPM, as shown in FIGS. 7A to 7D. Reduced IEPM quality reduces the magnitude of loss modulus which is an indicator of material damping via IEPM. In IEPM-$t_c=24$ in FIG. 8A, only phase-physical changes in polyurea and cured epoxy exist. The IEPM polymerization does not occur for the physical mixture or juxtaposition of epoxy and polyurea. TMA does not indicate IEPM-$t_c=24$ as a third material in addition to epoxy and polyurea. Table 2 involves glass transition characteristics for various IEPM-$t_c$ constructions, designed with different $t_c$, epoxy-resin viscosity ($v$), and PU type (aliphatic, aromatic, and hybrid) moieties, where $\Delta T_{g,\ IEPM-tc} = T_{g,\ C-IEPM-tc} - T_{g,\ PU}$; and $\Delta_v T_{g,\ PU} = T_{g,\ PU\ (v=1,367)} - T_{g,\ PU\ (v=534)}$.

factured using aliphatic polyurea moieties, and the epoxy was manufactured using a low-viscosity resin ($v=534$ cps). Further in FIG. 8A, $T_{g,\ IEPM-tc}=2.5=140.66°$ C. and $T_{g,\ IEPM-tc}=3.5=140.52°$ C. Although the slopes of the curves at $T=T_{g,\ IEPM-tc=2.5}$ and $T=T_{g,\ IEPM-tc=3.5}$ are negative, the C-IEPM-$t_c=2.5$ curve is also characterized by regeneration, or recovery. The sudden drop in $\Delta$D is a precursor to re-generativity (or upward trend of $\Delta$D) of the IEPM. The upward trend of $\Delta$D defines the molecular resilience property of IEPM. There is chemical bonding in IEPM ($t_c<2.4$) which is molecularly resilient. In C-IEPM-3.5, the decrease in $\Delta$D at $T=T_{g,\ IEPM-3.5}$ ($=140.52°$ C.) is gradual (not sudden). The gradual decline of $\Delta$D indicates reduced re-generativity of IEPM at higher $t_c$, which includes IEPM-$t_c \geq 3.5$. The $T_{g,\ epoxy}$ of C-IEPM-$t_c=2.5$ and C-IEPM-$t_c=3.5$ are expectedly similar ($T_{g,\ epoxy}=71.68°$ C. and $T_{g,\ epoxy}=71.32°$ C.) and are not influenced by $t_c$. The similarity of $T_{g,\ epoxy}$ indicates that the degree of epoxy cross-linking just before reacting with (—NCO) functional groups is similar.

In one embodiment, chemical bond richness and regenerative characteristics vary in each IEPM-$t_c$ material depending on $t_c$, $v$, and PU type as shown in FIGS. 5, 6, and 7A to 7D. Referring to FIG. 8B, re-generativity/resiliency of IEPM is a function of $v$, using low-$v$ ($=534$ cps) and medium-$v$ ($=1,367$ cps). TMA reveals that larger $v$ produces larger $T_{g,\ IEPM}$, greater epoxy cross-linking, per an increase in $T_{g,\ epoxy}$, and greater polyurea cross-linking. Similar to the case for $t_c=24$, greater epoxy reactivity (smaller $t_c$ and smaller $v$) means smaller $T_{g,\ epoxy}$ ($T_{g,\ epoxy,\ v=1,367}=85.66°$ C. and $T_{g,\ epoxy,\ v=534}=71.32°$ C. in Table 2) and smaller $T_{g,\ PU}$ ($T_{g,\ PU,\ v=1,367}=141.77°$ C. and $T_{g,\ PU,\ v=534}=116.22°$ C. Resin viscosity ($v$), rather than $t_c$, is a more critical design parameter in epoxy cross-linking and to the strength and stiffness of x-IEPM-$t_c$. Larger $v$ reduces the loss modulus of IEPM. Although smaller $v$ enhances polyurea reactivity to produce better quality IEPM than using larger $v$ in IEPM-$t_c>2.5$, the degree of re-generativity is minimal.

|  | $v = 534$ cps Aliphatic | | | $v = 1,367$ Aliphatic | $v = 534$ Aromatic | $v = 534$ Hybrid |
|---|---|---|---|---|---|---|
| $t_c$ (hrs)\ | $t_c = 2.5^1$ | $t_c = 3.5^3$ | Full-cure ($t_c = 24$) | $t_c = 3.5^4$ | $t_c = 2.5^5$ | $t_c = 2.5^6$ |
| $T_{g,\ C-IEPM-tc}$ | 140.66 | 140.52 |  | 156.31 | 192.66 | 171.05 |
| $T_{g,\ PU}$ | 115.87 | 116.22 | 133.69 | 141.77 | 142.17 | 162.88 |
| $T_{g,\ epoxy}$ | 71.68 | 71.32 | 69.1 | 85.66 | 71.33 | 77.98 |
| $\Delta_v T_{g,\ PU}$ |  | $25.55^{4-3}$ |  |  | $20.7^{6-5}$ | 47.01 |
| $\Delta_{PU} T_{g,\ PU}$ | $26.30^{5-1}$ |  |  | 14.54 | 50.49 | 8.17 |
| $\Delta T_{g,\ C-IEPM-PU}$ | 24.79 | 24.3 |  |  |  |  |

Table 2 further shows that for C-IEPM-$t_c=24$, $T_{g,\ PU}=133.69°$ C. is significantly larger than $T_{g,\ PU}$ for C-IEPM-$t_c=2.5$ ($115.87°$ C.) and C-IEPM-$t_c=3.5$ ($116.22°$ C.). The difference in $T_{g,\ PU}$ is a result of the slower polymerization rate of polyurea when it is applied to fully cured epoxy. For $<24$, large ambient heat generated by the exothermicity of curing epoxy during the formation of IEPM increases the reaction rate of the applied polyurea, therefore lowering its $T_{g,\ PU}$. Material damping (loss modulus) in IEPM-$t_c=24$ is 0 because along the boundary between pure polyurea and pure epoxy are only physical mixtures (no chemical bonding). Along the boundary of the 0-IEPM-$t_c=24$ sample, there is no formation of IEPM. The loss modulus in IEPM decreases as $t_c$ increases.

Figure 8A:
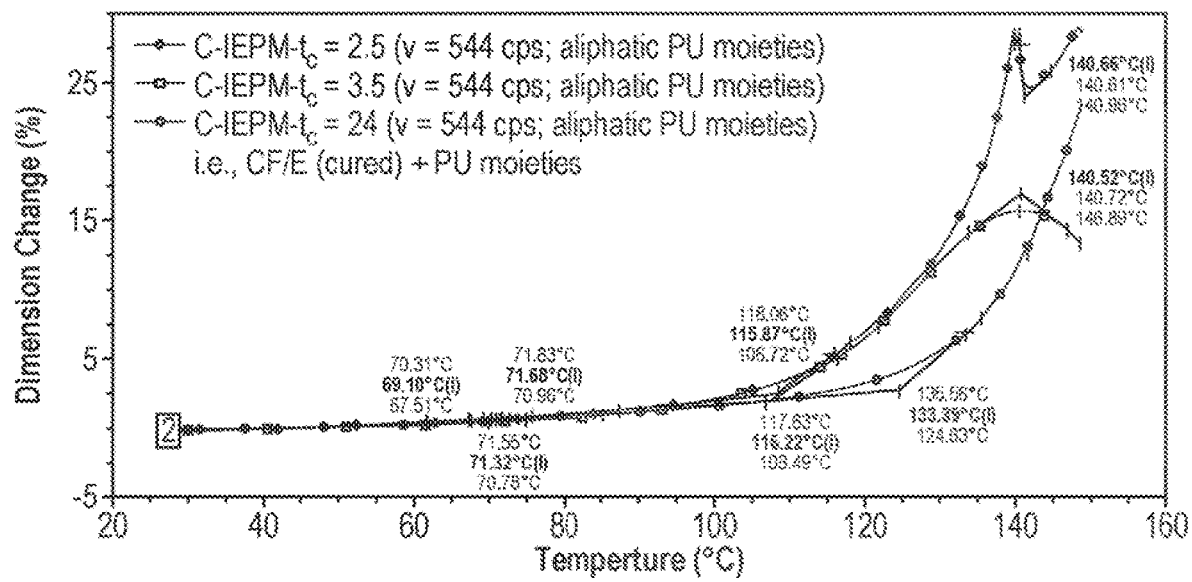
FIG. 8A is a graph for thermomechanical analysis (TMA) results showing IEPM re-generativity based on $t_c$ (curing time of the epoxy prior to its reaction with the polyurea moieties, therefore commencing the IDA reaction), according to an embodiment of the present invention.
Figure 8B:
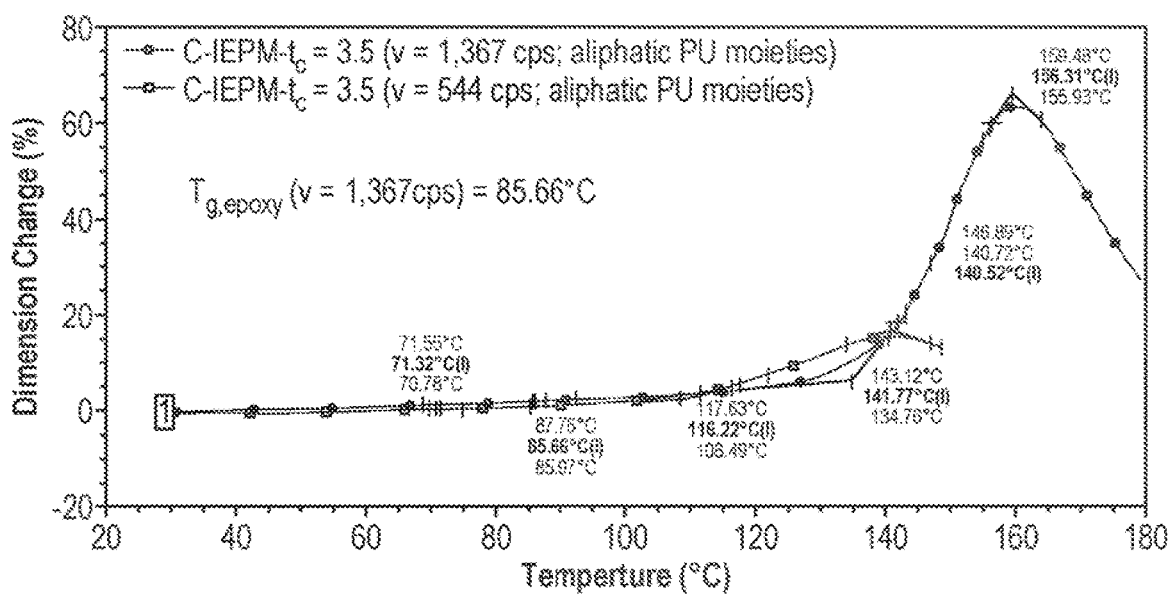
FIG. 8B is a graph for TMA results showing IEPM re-generativity based on v (viscosity of the epoxy resin, or the resin that hardens to produce epoxy), according to an embodiment of the present invention.

Referring to FIG. 8A, AD versus T for C-IEPM-$t_c=2.5$ and C-IEPM-$t_c=3.5$ is compared. The samples were manu- The resin-blend component of aliphatic or aromatic polyurea contains amine-terminated resins, which affect polyurea dry-time and the initial reaction. The lack of polyol in the urea molecule having the isocyanate prepolymer in aliphatic systems minimizes moisture content in the IEPM and also facilitates the rapid reaction between (—NCO) and (—NH$_2$)-epoxy (hardener) functional groups in the formation of high-quality IEPM (chemical bond richness, especially at lower $t_c$ and specifically at $t_c=0$). IEPM rapid reaction manifests as lower polyurea cross-linking and lower $T_g$, pu. The resin-blend portion of aliphatic polyurea contains an attractive reduced dry-time feature that enhances (—NCO) reactivity with epoxy.

Figure 8C:
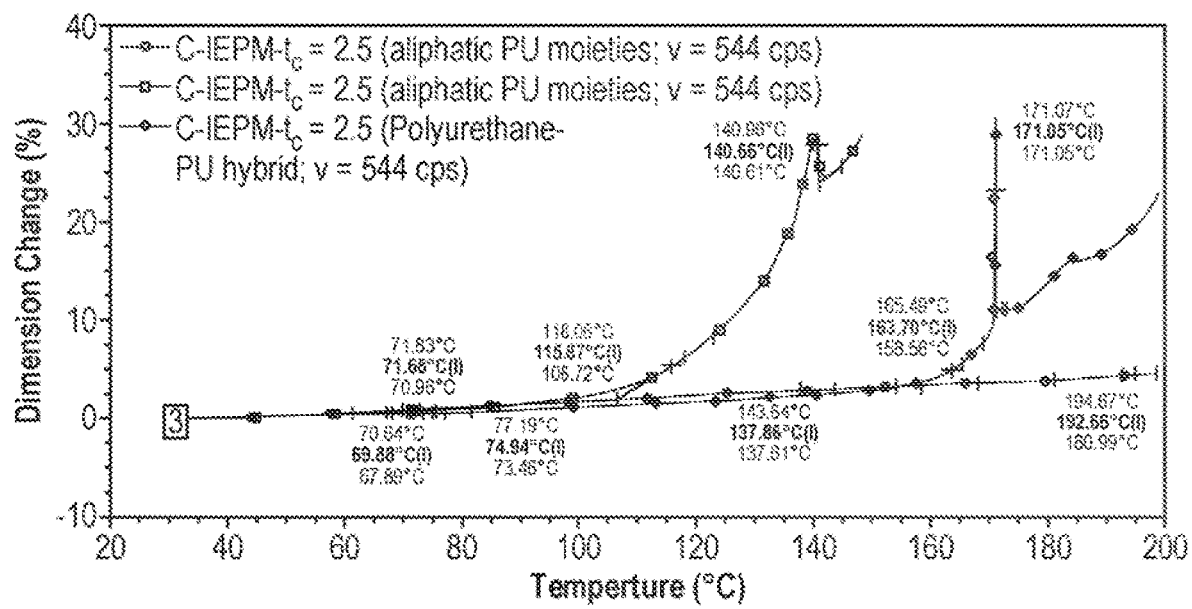
FIG. 8C is a graph for TMA results showing IEPM re-generativity based on the polyurea (PU) moieties, according to an embodiment of the present invention.

FIG. 8C compares TMA characteristics of C-IEPM-$t_c$ specimens according to polyurea type, which may be aliphatic, aromatic, or hybrid polyurea. $T_{g,\ epoxy}$ is independent of polyurea type. For common $t_c$ and $\nu$, $T_{g, PU, hybrid} > T_{g, PU, aromatic} > T_{g, PU, aliphatic}$ IEPM regeneration depends on $t_c$ (FIG. 8A), $\nu$ (FIG. 8B), and PU moieties (FIG. 8C). Lower $t_c$ and lower $\nu$ help to reduce $T_{g, PU}$. Further, $T_{g, IEPM, aliphatic} < T_{g, IEPM, aromatic}$, and $T_{g, IEPM, aliphatic} < T_{g, IEPM, hybrid}$. The sharp drop in $\Delta D$ at $T = T_{g, IEPM, hybrid}$ signifies that although there is the formation of new material (IEPM), the large magnitude of the drop (from $\Delta D=30\%$ to $\Delta D=12\%$) followed by subsequent smaller rises and drops in FIG. 8C indicate that hybrid PU groups do not sufficiently react with epoxy groups to produce molecularly resilient and quality IEPM. x-IEPM-$t_c$ manufactured at lower $t_c$, lower $\nu$ and using the urea molecule from aliphatic polyurea moieties elicits lower $T_g$, IEPM, which effectuates greater IEPM resiliency (recoverability). A sharp downward slope at $T_g$, IEPM indicates re-generation of IEPM as a function of $t_c$, wherein $t_c<24$. Regeneration (reformation of IEPM molecular structures) is more prominent if $\Delta T_{g, IEPM-PU}$ is relatively large and if $T_{g, PU}$ is small (which may be induced using smaller $\nu$ or if the urea molecule contains an isophorone diisocyanate and polyoxypropylene diamine prepolymer). IEPM regeneration enhances the loss modulus property of IEPM, which is independent of epoxy cross-linking.

Larger $\Delta T_{g, IEPM-PU}$ and lower $T_{g, PU}$ improve IEPM quality (fewer voids and interfacial gaps), leading to longer polymer chains and greater IEPM bond strength. If at $T=T_g$, $_{IEPM}$, there is not a significant decrease in $\Delta D$ (unlike $\Delta D$ in FIG. 8C where PU=hybrid polyurea), IEPM quickly re-catalyzes (the slope of VD vs T tends upward again). This confirms a stable molecular resilient IEPM material. Molecularly resilient IEPM constructions that can stably and quickly recover indicate substantial loss modulus and fracture toughness (and in general bulk energy transferability) to x-IEPM-$t_c$-retrofitted or strengthened structures that are subjected to extreme load conditions.

Dynamic Mechanical Analysis (DMA) and Reduced Elastic Modulus, Er

Figure 9:
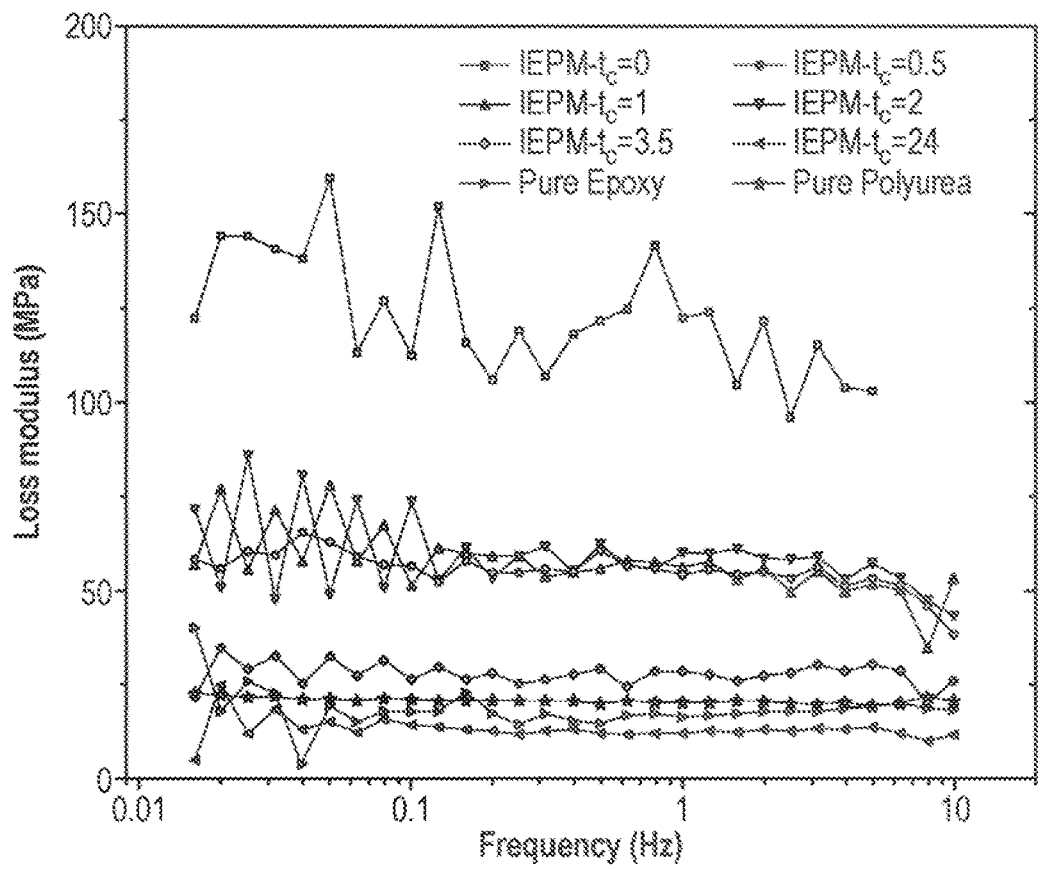
FIG. 9 exemplarily illustrates a graph showing loss modulus of IEPM-$t_c$, which is the IEPM material produced at a specific $t_c$, according to an embodiment of the present invention. The IEPM material may be designated as "IEPM," or as "IEPM-$t_c$."

In one embodiment, the loss modulus in materials is analyzed utilizing Dynamic Mechanical Analysis (DMA) using an RSA-G2 Solids Analyzer. Referring to FIG. 9, the loss modulus in 0-IEPM-$t_c$ samples and the loss moduli of pure polyurea and neat epoxy are shown using DMA. The loss modulus of polyurea and loss modulus of epoxy are only 17~20 MPa.

Using low $\nu$ and aliphatic PU moieties, FIG. 9 distinguishes the loss moduli of IEPM-$t_c$ that are manufactured using (a) $t_c=0$; (b) $0<t_c \leq 2$; (c) $3.5 \leq t_c \leq 24$. For IEPM-$t_c$ where $0<t_c \leq 2$, weaker presence of secondary amine bending (N—H) modes (1550 cm-1, shown in FIG. 6F for $t_c=1.0$) led to a reduction of the loss modulus. The loss modulus of IEPM-$t_c=0$ is approximately two times larger than the loss modulus of IEPM-$t_c$-0.5 and approximately five times larger than the loss modulus of IEPM-$t_c=3.5$. The presence of N—H and C—N modes, validated in IEPM regions that were produced at smaller $t_c$, explains the decrease in damping (loss modulus) of IEPM at larger $t_c$. The results correlate to the IEPM topography via AEM in FIGS. 5A to 6Y.

Large $E_r$ in the IEPM indicates strong epoxy presence in after IDA surface modification/reaction. The large $E_r$ further indicates greater energy absorption capability of IEPM-$t_c$ and x-IEPM-$t_c$ via surface modification. The significant presence of $E_r$ is not to be conflated with the viscoplasticity evinced during the period of flow, even though both properties depend on $t_c$. The molecular vibrational property of the IEPM, following IDA modification herein and using aliphatic moieties, and the viscoplasticity property evinced during the period of flow both depend on tc. Using $t_c>0$ to manufacture IEPM, for example, IEPM-$t_c=0.5$, where the width of the IEPM is approximately 30 pm, displays less physical "topography," or jaggedness, and also less distinctiveness than the topography of IEPM-$t_c=0$ because the number of reactions between (—NH$_2$)-hardener (from epoxy) and epoxide increases to produce epoxy (outside of the IEPM region), therefore reducing the number of reactions between (—NCO) groups and (—NH$_2$)-epoxy to engender the IEPM and therefore also reducing $E_r$ (and storage modulus) of the IEPM.

The link between larger $E_r$ at lower $t_c$ to enhance material damping and to sustain the large mechanical strength of x-IEPM-$t_c$ is consistent with DMA and nanoindentation test results, where larger Er correlate to smaller $t_c$. The AEM, NMF, and nanoindentation test results show that the energy absorption of IEPM at larger $t_c$, e.g., $t_c>2.5$, was mainly controlled via physical mixtures across the narrow (~2 μm) IEPM material. The properties of the physical mixtures include hysteretic damping and viscoplasticity rather than chemical bonding via IDA modification (using aliphatic polyurea moieties).

The shock-dynamic (ballistics) test results revealed that using multiple layers of x-IEPM-$t_c$ successfully either repercussed or absorbed high-caliber bullets without back-face deformation or back-end penetration. In another embodiment, a multi-layer x-IEPM-$t_c$ design with or without ultra-high molecular weight polyethylene (UHMWPE) also successfully repercussed or absorbed high-caliber bullets without back-face deformation or back-end penetration.

Advantages

In one embodiment, the composite adds sustainability and tremendous energy transferability to conventional high-strength fiber technology. In another embodiment, the composite could localize damage in conventional high-strength fiber technology. Depending on the curing time of the epoxy, which elicits unique levels of tackiness or non-tackiness (but that has not been cured), the degree of strength sustainability, energy transferability (absorption/dissipation), and resiliency (recoverability from damage) could be dialed-in.

In yet another embodiment, the composite provides a new generation of advanced seismic protection material that could mitigate damage to wood-framed structures and concrete structures by combining a high-strength/highly stiff material with highly efficient energy absorption/dissipation and ductility. In yet another embodiment, the composite could protect non-structural and structural components of wood-framed structures against pulse-type, near-field earthquakes.

In yet another embodiment, the composite could dissipate incoming earthquake and debris-impact energy (tornados) to subsequently reduce acceleration demands in structures and yet remain adequately stiff to reduce inter-story displacements. In some embodiments, the composite includes fire-resistant properties to provide intumescence. The elastomeric polyurea coating decreases the intensity of heat to the polyurea and the load-bearing high-strength material.

In yet another embodiment, the composite may have adhered to the exterior sides of the base plates and load-bearing walls ("skeletal frames") of wood-built homes to create a "rubberized shear wall" that could be used instead of traditional types of plywood shear walls or metal straps. Further, the composite could provide a necessary energy "release valve" and fire-resistivity to protect non-structural and structural components against earthquakes and fires.

In yet another embodiment, the IEPM constructions integrate a library, or family, of desirable and designable bulk properties, including fracture toughness and damping, into large-scale structures to protect these structures against extreme multi-hazards load environments. Environments and protective systems include tornado storm rooms, hurricane-resistant coastal bridges, seismic-resistant bridges and buildings, and ballistic-resistant military panels, including hard-shelled vest plates and plates to manufacture rucksacks.

In yet another embodiment, multiple layers of x-IEPM-$t_c$ construction, totaling about 1 inch in thickness, provide ballistic resistance up to and including 0.22 LR, 9 mm, 0.45 AGP, 0.357 magnum, 0.44 magnum, AR15, 0.308, and .30-06 caliber bullets. In yet another embodiment, the multiple layers of x-IEPM-$t_c$ may include thin plies of ultra-high-molecular-weight polyethylene (UHMWPE) that are inserted inside or outside of the x-IEPM-$t_c$ construction, where x may or may not be equal to 0. The UHMWPE may or may not be compressed according to the standard method of compressing UHMWPE. For example, the UHMWPE plies may be inserted towards the back-end of the x-IEPM-$t_c$ construction. For ballistic applications, sample x-IEPM-$t_c$ may or may not include UHMWPE compressed or non-compressed plies.

In yet another embodiment, the construction of x-IEPM-$t_c$ may include pre-polymerized polyurea, or in its reactive or functional form. The polyurea moieties could be an aliphatic, an aromatic, or a hybrid polyurea material.

In yet another embodiment, the pressure at 2,300 psi and temperature 105° F. of sprayed polyurea may be composed of a reaction between isophorone diisocyanate and polyoxypropylene diamine (forming urea bonds) that reacts with a Part B resin of conventional polyurea that contains amine (—$NH_2$) functional groups to elicit ballistic resistance in x-1EPM-$t_c$ designed panels against sharp objects, including AR 15 and .308 caliber bullets. In yet another embodiment, lower temperature (105 C'F) promotes less polyurea reaction. In some embodiments, lower temperature (105° F.) increases the likelihood that (—NCO) functional groups of urea chemical structures in FIG. 3A will react with amine (—$NH_2$) functional groups from curing epoxy to form higher quality IEPM.

In yet another embodiment, a higher quality IEPM enhances properties of fracture toughness and material damping in ballistic-resistant x-IEPM-$t_c$ panels, which may or may not also include UHMWPE plies inserted internally or attached externally to the x-IEPM-$t_c$ construction. Fracture toughness is a critical and highly desirable property in composites systems, especially brittle composites such as carbon-fiber systems. In yet another embodiment, higher pressure (2,300 psi) creates a denser polyurea on the surface of x-IEPM-$t_c$.

In yet another embodiment, the construction of x-IEPM-$t_c$ using higher pressured polyurea, for example, 2,300 psi, helps to reduce voids on the epoxy surface to (a) create a denser IEPM with greater energy absorption via molecular vibrational properties, and (b) create a denser polyurea with greater energy absorption via viscoelastic energy of the polyurea. In yet another embodiment, this construction enhances resistance of x-IEPM-$t_c$ to large impact forces which includes ballistic forces. In yet another embodiment, projectiles associated with ballistic forces including 0.30-06 and .308 caliber bullets may heat the polyurea beyond its glass transition temperature ($T_g$), evoking viscoelastic properties of the denser polyurea.

In yet another embodiment, energy absorption via polyurea viscoelasticity is substantially less than energy absorption via IEPM molecular vibrational properties following surface modification of the epoxy surface. In yet another embodiment, at impact locations on x-IEPM-$t_c$, it is important to minimize, or "localize," the spread of the high-shock ballistic impact by maximizing energy absorption. In yet another embodiment, at lower polyurea pressure, e.g., 1,800 psi, a looser (less dense) polyurea is produced. Although this reduces energy absorption of x-IEPM-$t_c$ via the IEPM molecular vibrational properties and via polyurea viscoelasticity, there is sufficient surface-modified epoxy (via epoxy exchange reactions) coupled with microscopically adjacent stiff epoxy (un-modified epoxy) to engage a larger fibrous area that enables x-IEPM-$t_c$ to more effectively resist relatively "blunt" ballistic impacts, e.g., from the impact of 0.44 magnum caliber bullet, covering a larger microscopic area.

In yet another embodiment, at smaller $t_c$, the chemical bond richness and enthalpy of the chemical bonds of IEPM increases, introducing larger loss modulus to x-lEPM-$t_c$-designed structures. This includes ballistic-resistant plates or panels, tornado-resistant storm walls and doors, thin-wythe concrete tilt-up wall constructions, and hurricane-resistant coastal bridges, specifically the girder-to-cap-beam connection-details. The results may be applied across multiple-scales to integrate damping and fracture toughness properties into several large-scale systems. The large-scale systems include, but are not limited to, ballistic-resistant plates, including shields and military structures; coastal bridges, including their connection-details at the girder-to-cap-beam region, that are subject to extreme surge and lateral wave forces; residential storm rooms and constructions subject to EF-5-rated tornados, including severe debris-impact forces; energy-efficient wall constructions and general residential constructions that are energy-efficient, fire-resistant, and debris-impact resistant; impact resistant and energy efficient concrete tilt-up wall constructions used in commercial warehouses; blast resistant structures; moisture-resistant systems, including homes; and carbon-fiber systems that combine large sustainable mechanical performance with reduced carbon fiber consumption to lower cost and also the carbon footprint. Particularly, the composite provides tornado resistance; fire-intumescence/02 blockage; and protection against low- and high-level design basis threats.

In yet another embodiment, the IEPM material and its method of integration into each platform engenders bulk energy transferability into x-F/E composites via IDA modification of the epoxy to overcome inherent limitations of fiber-reinforced epoxy (x-F/E), including epoxy, to overcome performance limitations, and to reduce fiber production, $CO_2$ emissions, cost, and waste.

In yet another embodiment, the IEPM material and its method of integration into each platform lower the carbon footprint by lowering $CO_2$ consumption. In some embodiment, the IEPM material and its method of integration into each platform uses highly reactive diisocyanate pre-polymer that may be manufactured using $CO_2$ waste-carbon captured from carbon feedstocks, further reducing the carbon footprint. In some embodiment, C-IEPM-$t_c$ exhibits desirable macro-mechanical features, such as vibration suppression, high-impact resistance, and fails in a ductile manner, exhibiting high damage-tolerance. In yet another embodiment, IEPM engenders a multi-scale science that links nanoscale chemical changes to bulk material properties in IEPM polymer composites subject to impact dynamics, including but not limited to, ballistic-scale forces.

Applications

To advance this method and composite, hindered (poly)-urea bonds (HUB) are used to dial-in reaction rates. An increase in diffusion flux and chemical potential is expected to create higher reaction rates of the functional groups, leading to higher enthalpy, and for certain already-identified IEPM chemical bonds, higher vibrational energy. Furthermore, HUB s naturally introduce self-healing properties, further benefitting the x-IEPM-$t_c$ structure. In order to create a second IEPM within the same x-IEPM-$t_c$ structure, dissociative (reversible) properties of HUB s may be utilized. Dissociation reactions of overlying HUB (to the underlying epoxy) to isocyanate and amine is a thermodynamic equilibrium, and the equilibrium constant can be controlled by temperature ($T_a$). Higher temperatures will adjust the equilibrium towards the dissociation side, resulting in free isocyanate and amine groups in hindered polyurea materials. At the same time, the reactions between those free groups and the amine/epoxide groups in epoxy materials are accelerated by high temperatures.

Figure 10A:
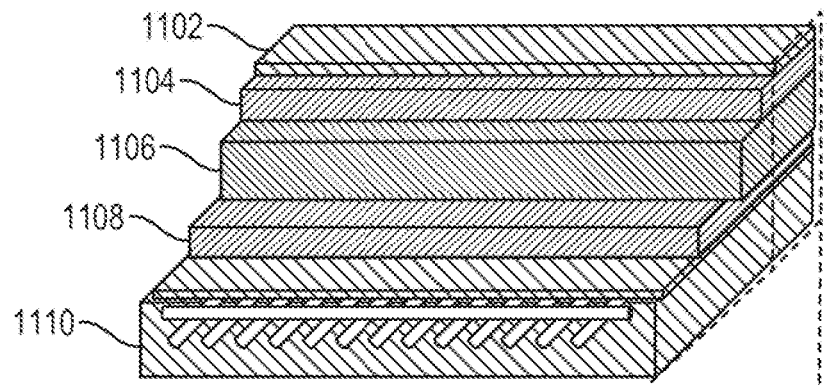
FIG. 10A exemplarily illustrates an architecture of an m-x-IEPM-$t_c$, or as multiple (m) layers of IEPM-$t_c$ applied to a fibrous composite material (x) that may be C-F/E where "C" designates carbon-fiber), according to an embodiment of the present invention.
Figure 10B:
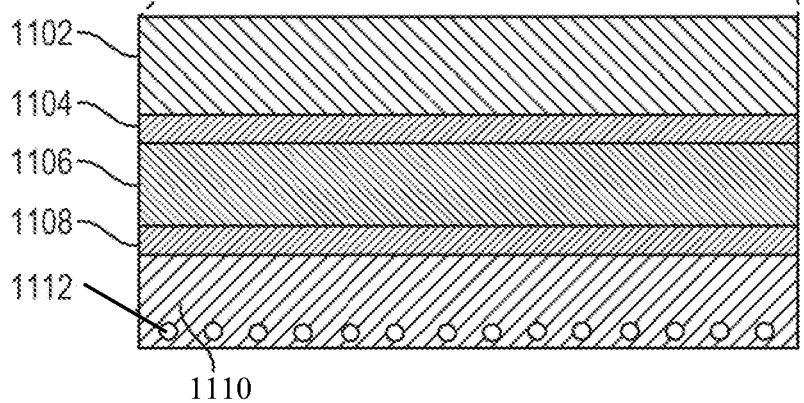
FIG. 10B exemplarily illustrates a construction of m-x-IEPM-$t_c$ of the portion of FIG. 11A, according to an embodiment of the present invention.

Referring to FIGS. 10A and 10B, the m-x-IEPM-$t_c$ architecture includes (a) IEPM1 1108 which is a reaction between epoxy 1110 and a pre-polymerized slow-curing HUB; (b) self-healing HUB; and (c) IEPM2 1104 which is a reaction between dissociative HUB and new epoxy. In conjunction with HUB dynamicity and reversibility, it is hypothesized that tunable reaction kinetics and thermodynamic equilibriums of IEPM chemistries can better link nanoscale changes to bulk mechanical energy transferability. Referring to FIGS. 10A and 10B, the architecture includes epoxy 1102, IEPM2 1104, polyurea (HUB) 1106, IEPM 1 1108, and fiber 1112 saturated in epoxy 1110.

Figure 11A:
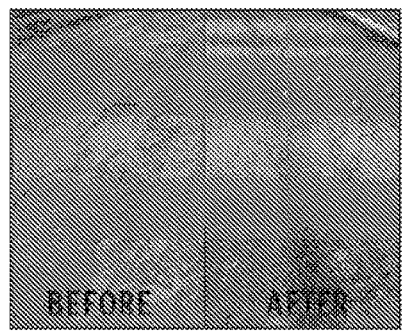
FIG. 11A exemplarily illustrates a comparison of the roadway system after and before the IDA reaction that produces the IEPM material, according to an embodiment of the present invention.
Figure 11B:
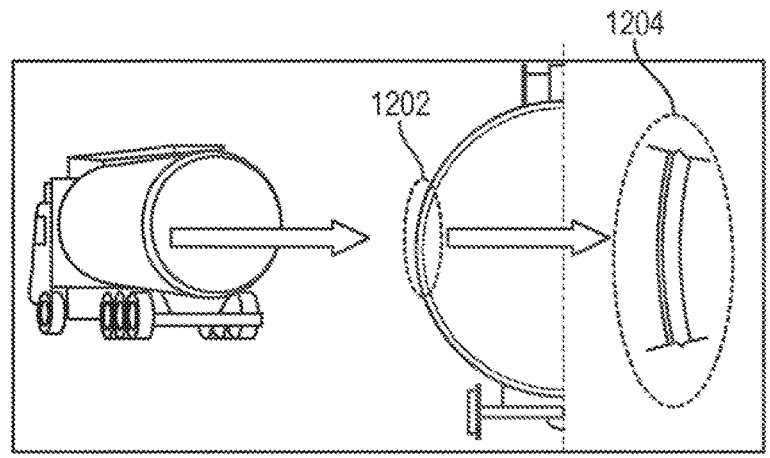
FIG. 11B exemplarily illustrates a chemical truck carrier using C-IEPM-$t_c$ lining, according to an embodiment of the present invention.

The composite may be applied across multiple-scales to integrate several damping and toughness attributes into several large-scale systems, including, but limited, to self-healing roads, shown in FIG. 11A; oil and gas industries for chemical tanker protection against terrorist attacks, shown in FIG. 11B; blast resistance including low and high-level design basis threats; fire resistance (Fire-intumescence (02 blockage) & fire spread-ability; thermal insulation and recyclability including energy harvesting and reversibility; dry cask storage tanks for nuclear storage; moisture resistance due to flooding, heavy rains, and humidity; wind turbine blade manufacturing; sports equipment such as helmets, chest protectors, and race car components (NASCAR); and biomedical applications.

Figure 11C:
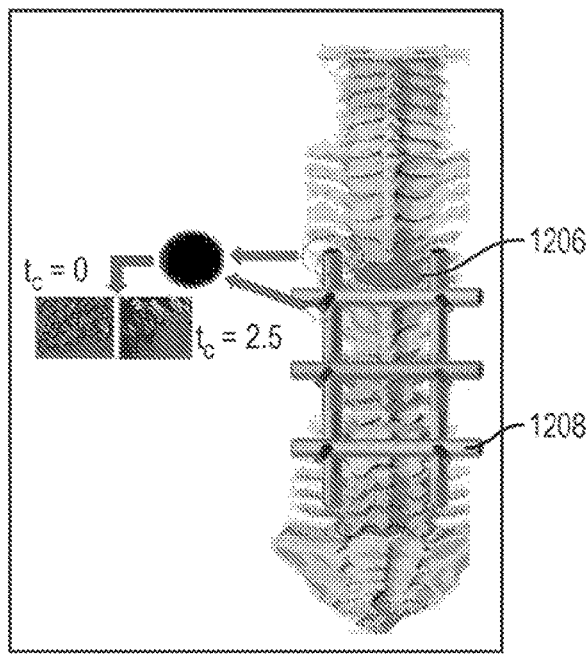
FIG. 11C exemplarily illustrates IEPM material applied to biomedical applications, according to an embodiment of the present invention.

The biomedical applications include safety devices against Traumatic Brain Injury (TBI) and Traumatic Chronic Encephalopathy (CTE). Referring to FIG. 11C, the biomedical application further includes spinal rod infusion to mitigate Proximal Junctional Kyphosis (K). Referring to FIG. 11B, the chemical truck carrier protected using C-IEPM-$t_c$ lining 1202. Numeral 1204 represents the zoom view of lining 1202. Referring to FIG. 11C, x-IEPM-$t_c$ spinal fusion rods 1208 to regenerate spinal mobility and physical activity in patients with deformed segments in the lumbar vertebrae is shown. The region of high-stress concentration is represented by numeral 1206. As a result, targeted performance goals of utilizing x-IEPM-$t_c$ spinal-fusion rods are to enhance patient motion; minimize pain associated with rigid spinal cage structures due to stiffness incompatibilities, and minimize post-spinal-surgical complications due to proximal junctional kyphosis (PJK) in patients with osteoporosis or scoliosis.

In summary, the present disclosure provides a material composed of a layer of polyurea prepolymer (moieties), specifically aliphatic polyurea moieties, coated on an exposed surface of pre-curing (tc=0), curing ($0.5 \leq tc \leq 1-5$), or tacky ($1.5 < tc < 24$) epoxy, forming an interfacial epoxy-polyurea hybridized-matrix (IEPM) material. The IEPM material possesses molecular vibrational properties that are controlled by parameter $t_c$ (in hours) that controls the thermodynamic state of the pre-curing, curing (wet), or tacky (sticky to the touch) epoxy before it reacts with the (aliphatic) polyurea moieties. The IEPM material is formed by surface modification of the reactive epoxy, wherein reaction of isophorone diisocyanate and polyoxypropylene diamine produces a latent amine-rich urea molecule with isocyanate functional groups that reacts with amine (hardener) functional groups from pre-curing, curing, or tacky epoxy. This is the isophorone diisocyanate amine (IDA) modification.

The polyurea is an aliphatic prepolymer (or pre-polymerized) polyurea, and is a fire-resistant intumescent polyurea layer. The polyurea layer is at least one of a fast-curing or a slow-curing prepolymer (pre-polymerized) polyurea.

Production of the IEPM material reduces $CO_2$ emissions by utilizing carbon feedstocks to produce the isophorone diisocyanate used in the IDA reaction. Further, the epoxy is composed of a low-viscosity epoxy resin. The IEPM material is molecularly resilient, or regenerative, using lower values of $t_c$, low-viscosity epoxy resin, and aliphatic polyurea moieties. Also, the IEPM material has tremendous loss modulus, fracture toughness, and reduced elastic modulus properties that are especially substantial at $t_c$=0. The IEPM material also provides moisture resistance, which is largest if the IEPM is produced using $t_c$=0, aliphatic polyurea moieties, and a low-viscosity epoxy resin. Yet further, the IEPM material provides thermal insulative properties which are largest if the IEPM material is produced using $t_c$=0, aliphatic polyurea moieties, and a low-viscosity epoxy resin.

The bulk material properties of the IEPM material introduce tremendous energy transferability. As such, the topography of the IEPM material produced using $t_c$=0, low-viscosity epoxy resin, and aliphatic polyurea moieties is likened to that of a "beach-pebble" topography that indicates its ability to safely transfer large influxes of energy arising from extreme natural and human-caused forces. Preferably, the IEPM material has a width of 2 μm to 50 μm, and comprises an x-IEPM-$t_c$ composite, wherein said composite may include a fiber (x) reinforced epoxy (x-F/E) on one side of the IEPM material, and a layer of fully cured polyurea on the other side of the IEPM material. Moreover, the fiber (x) reinforced epoxy layer may be a carbon-fiber reinforced epoxy layer (C-F/E).

In further summary, another aspect of the present disclosure, here is provided a composite system having a substrate and a fiber (x) reinforced polymer layer (x-FRP), which may be a fiber (x) reinforced epoxy (x-F/E) layer, attached to at least a portion of the substrate. IEPM material produced via IDA surface modification is attached to at least a portion of the substrate or attached to at least a portion of the x-FRP layer, or if the x-FRP layer is specifically an x-F/E layer, then the IEPM is attached to at least a portion of the x-F/E layer to produce an x-IEPM-$t_c$ composite. The IEPM may also be attached directly to at least a portion of the substrate. The IEPM material may be attached continuously to at least part of the x-F/E via curing epoxy (that has not fully cured) to produce x-IEPM-$t_c$ or it may not be attached continuously to the x-FRP which may be an x-F/E.

The presently disclosed composite system provides composite incorporation of molecular vibrational properties of the IEPM material, manifested as bulk energy transferability properties, such as loss modulus, fracture toughness, and reduced elastic modulus. The IEPM material incorporates damage recoverability into said composite via molecularly resiliency and incorporates tremendous impact dynamics resistance, including damage mitigation and structural resiliency, against ballistic forces. Moreover, the composite system includes ultra-high molecular weight polyethylene (UHMWPE) layer. Further, the composite system demonstrates tremendous surge and wave force dynamics resistance, including damage mitigation and structural resiliency, against hurricane forces on coastal bridges. Still further, the composite system incorporates tremendous impact resistance, including damage mitigation and structural resiliency, against debris-borne wind impact tornado forces on wood-frame residential and commercial constructions, concrete residential and commercial wall constructions, and tornado storm-room constructions.

The presently disclosed composite system incorporates tremendous suppression of vibrational/oscillatory forces and motions, including damage mitigation and structural resiliency, that induce significant displacement, velocity, and acceleration caused by lateral and vertical seismic forces on bridges and buildings and their contents.

As here demonstrated, the composite incorporates tremendous crashworthiness, including damage mitigation and structural resiliency, against automotive impacts, including head-on collisions, as well as tremendous blast resistance, including damage mitigation and structural resiliency, against large design-basis threats (DBTs).

According to yet a further aspect of the present disclosure, the composite system composite material reduces carbon dioxide ($CO_2$) emissions, as well as incorporates moisture resistance through tremendous impact dynamics resistance, including damage mitigation and structural resiliency, against ballistic forces.

In operation, the presently disclosed subject matter provides a method for strengthening or reinforcing a substrate, the method the includes a substrate and forms a fiber (x) reinforced polymer (x-FRP) layer, which may be a fiber (x) reinforced epoxy (x-F/E) layer, on at least a portion of said substrate. The method includes applying a pre-curing (just-mixed, or nearly just-mixed), curing (wet), or tacky (sticky) epoxy to said x-FRP or x-F/E, which may have been already cured or may not have been already cured, and spraying polyurea moieties over said pre-curing, curing, or tacky epoxy surface. Here, the novel formation of the x-IEPM-$t_c$, which includes a fiber (x) reinforced epoxy, includes the steps of applying epoxy to at least a portion of said substrate and, further, applying fiber (x) over said epoxy; and allowing said epoxy to saturate, followed by applying epoxy to said fiber to further saturate the fiber (x) and also to reside on the surface of said fiber and to not saturate, followed by application of polyurea moieties to the not-fully cured epoxy surface to produce the x-IEPM-$t_c$ composite that is adhered to at least a portion of the said substrate.

With the presently disclosed method, if no fiber is used (x=0), the method comprises steps of applying epoxy to at least a portion of said substrate; and spraying polyurea moieties to the surface of said epoxy. If the matrix used to reinforce a fiber (x) is not epoxy and constitutes an x-FRP layer or if epoxy is used and has been allowed to fully cure on the fiber where it resides (where $t_c$=24 represents the fully cured condition), spraying polyurea moieties to the surface of the x-FRP or to the surface of the fully cured x-F/E means that the IEPM material is not continuously bonded to the substrate. Here, the fiber (x) reinforced epoxy layer may be a carbon-fiber reinforced epoxy (C-F/E) layer, and the polyurea layer may be a fire-resistant intumescent polyurea layer and may further be an aliphatic prepolymer (or pre-polymerized) polyurea. The epoxy is composed of a low-viscosity epoxy resin, wherein the polyurea layer is a fast-curing or slow-curing polyurea layer that reduces the carbon dioxide (CO2) emissions.

In essence, therefore, the disclosed subject matter provides a molecularly resilient and high-energy transferrable material and method of reinforcing and strengthening substrates with the same. The material includes aliphatic polyurea moieties coated on the surface of a pre-curing or curing epoxy, that may or may not compose a fiber reinforced epoxy (F/E) layer, constituting an isophorone diisocyanate amine (IDA) epoxy-surface modification (reaction) to form an interfacial epoxy-polyurea hybridized-matrix (IEPM) material between the epoxy (that may reside on an F/E layer) and a cured polyurea layer. Through its unique set of molecular vibrational properties, which are designed into the IEPM by controlling the thermodynamic IDA reaction, the chemically bonded and molecularly resilient (re-generative) IEPM material incorporates significant fracture toughness, loss modulus (material damping), and reduced elastic modulus into structural substrates and high-tenacity fibers to which it is adhered. During extreme multi-hazards force events, the IEPM adds designable sustainability, ductility, and resiliency into new or vulnerable (damaged) structures (substrates) by minimizing and localizing damage to the substrate and also to the reinforcing or strengthening (or stand-alone) fibers without debonding from the substrate or from the fibers, and also by increasing the bond strength between the fibers, i.e., fabric (if any), and the substrate. The material and method provide: Advanced seismic protection to bridges and buildings; Protection of coastal bridges against major hurricane surge and slamming wave forces; Protection of residential and commercial constructions against major tornado events; Automotive crashworthiness for vehicles; Ballistic resistance against extreme shock dynamic impacts; Blast resistance; Thermal/insulative and moisture control; and Reduction of $CO_2$ emissions via utilization of carbon feedstocks to manufacture the isophorone diisocyanate.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A material composed of:
an epoxy layer formed from an epoxy containing amine functional groups;
a polyurea layer formed from a polyurea prepolymer containing isocyanate functional groups applied onto said epoxy layer;
an interfacial epoxy-polyurea hybridized-matrix material (IEPM) layer between said polyurea layer and said epoxy layer, with said IEPM layer formed by reacting said isocyanate groups of said polyurea prepolymer with said amine functional groups of said epoxy,
wherein said IEPM layer has a loss modulus value, measured using dynamic mechanical analysis at any frequency between 0.0167 and 6.33 Hertz, which is greater than or equal to 47.7 MPa and less than or equal to 159.24 MPa, and
wherein said IEPM layer is formed prior to said epoxy containing amine functional groups forming a tacky epoxy surface.

2. The material of claim 1, wherein said polyurea prepolymer is a reaction product of isophorone diisocyanate with polyoxypropylene diamine or wherein said polyurea prepolymer is a reaction product of isophorone diisocyanate with polyol.

3. The material of claim 1, wherein said polyurea layer comprises a fire-resistant intumescent polyurea layer.

4. The material of claim 1, wherein said epoxy comprises either a low-viscosity epoxy resin prepolymer or a medium-viscosity epoxy resin prepolymer.

5. The material of claim 1, wherein said epoxy is composed of a low-viscosity epoxy resin.

6. The material of claim 1, wherein said IEPM layer comprises a width of 2 μm to 50 μm.

7. The material of claim 1, wherein said epoxy layer comprises a fiber (x) reinforced epoxy (x-F/E) layer.

8. The material of claim 7, wherein said fiber (x) reinforced epoxy layer comprises a carbon-fiber reinforced epoxy layer (C-F/E).

9. The material of claim 1, wherein said epoxy containing amine functional groups comprises an epoxy resin and an amine hardener.

10. The material of claim 1, wherein said IEPM layer includes absorption peaks, as measured by infrared spectroscopy, at each of 1510 $cm^{-1}$, 1550 $cm^{-1}$, 1606 $cm^{-1}$ and 1642 $cm^{-1}$.

11. The material of claim 1, wherein said IEPM layer includes an absorption peak, as measured by infrared spectroscopy, at 1510 $cm^{-1}$.

12. The material of claim 1, wherein said IEPM layer includes an absorption peak associated with C—C stretching or C=C stretching of aromatic rings within said IEPM layer.

13. The material of claim 1, wherein said IEPM layer has a width from 2 μm to 50 μm and includes an absorption peak, as measured by infrared spectroscopy, at 1090 $cm^{-1}$.

14. The material of claim 1, wherein said IEPM comprises an x-IEPM-$t_c$ composite, wherein said composite includes a fiber (x) reinforced epoxy (x-F/E) on one side of said IEPM material, and a layer of fully cured polyurea on an other side of said IEPM material.

15. The material of claim 14, wherein said fiber (x) reinforced epoxy layer comprises a carbon-fiber reinforced epoxy layer (C-F/E).

16. A composite system comprising:
a substrate; and
the material of claim 14 attached to at least a portion of the substrate.

17. The composite system of claim 16, wherein said fiber (x) reinforced epoxy layer comprises a carbon-fiber reinforced epoxy layer (C-F/E).

18. The composite system of claim 16, wherein said substrate comprises ultra-high molecular weight polyethylene (UHMWPE) attached to x-IEPM-$t_c$.

19. A material composed of:
an epoxy layer formed from an epoxy containing amine functional groups;
a polyurea layer formed from a polyurea prepolymer containing isocyanate functional groups applied onto said epoxy layer;
an interfacial epoxy-polyurea hybridized-matrix material (IEPM) layer between said polyurea layer and said epoxy layer, with said IEPM layer formed by reacting said isocyanate groups of said polyurea prepolymer with said amine functional groups of said epoxy,
wherein said IEPM layer is molecularly resilient with a glass transition temperature that is different than a corresponding glass transition temperature of said polyurea layer and said epoxy layer, said glass transition temperature measured using a TMA Q400 instrument, and
wherein said IEPM layer is formed prior to said epoxy containing amine functional groups forming a tacky epoxy surface.

* * * * *